United States Patent
Bain et al.

(10) Patent No.: US 12,066,819 B2
(45) Date of Patent: Aug. 20, 2024

(54) PRINTED FIDUCIAL SYSTEM FOR ACCURATE PICK AND PLACE

(71) Applicant: The Boeing Company, Chicago, IL (US)

(72) Inventors: David Michael Bain, Port Melbourne (AU); Martin Alexander Szarski, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 17/450,785

(22) Filed: Oct. 13, 2021

(65) Prior Publication Data
US 2023/0113580 A1 Apr. 13, 2023

(51) Int. Cl.
G05B 19/418 (2006.01)

(52) U.S. Cl.
CPC . G05B 19/41885 (2013.01); G05B 19/41825 (2013.01); G05B 19/4183 (2013.01); G05B 19/4188 (2013.01)

(58) Field of Classification Search
CPC ........ G05B 19/41885; G05B 19/41825; G05B 19/4183; G05B 19/4188
See application file for complete search history.

(56) References Cited

U.S. PATENT DOCUMENTS

| | | | |
|---|---|---|---|
| 5,209,804 A * | 5/1993 | Trudeau | B65H 3/122 |
| | | | 156/364 |
| 6,484,776 B1 * | 11/2002 | Meilunas | B32B 37/00 |
| | | | 156/581 |
| 6,681,151 B1 * | 1/2004 | Weinzimmer | B25J 9/1697 |
| | | | 356/243.1 |
| 7,513,964 B2 | 4/2009 | Ritter et al. | |
| 7,835,567 B2 | 11/2010 | Oldani | |
| 9,827,688 B2 | 11/2017 | Bain et al. | |
| 9,969,131 B2 | 5/2018 | Samak Sangari et al. | |
| 10,197,987 B2 | 2/2019 | Battles et al. | |
| 10,272,637 B2 | 4/2019 | Bolsee | |
| 10,442,087 B1 * | 10/2019 | Sweeney | B25J 19/021 |
| 10,710,318 B2 | 7/2020 | Stone et al. | |
| 2002/0185785 A1 * | 12/2002 | Thrash | B29C 70/48 |
| | | | 425/389 |

(Continued)

FOREIGN PATENT DOCUMENTS

DE 102013104609 B4 10/2016
WO 202174186 A9 6/2021

OTHER PUBLICATIONS

Eastmancuts, "Eastman C125 conveyor cutting system—Sunbrella" YouTube video, 2015, screenshot at timestamp 0:54, URL :<https://www.youtube.com/watch?v=Wv5oFu43rOw> (Year: 2015).*

(Continued)

*Primary Examiner* — Kenneth M Lo
*Assistant Examiner* — Jonathan Michael Skrzycki
(74) *Attorney, Agent, or Firm* — Yee & Associates, P.C.

(57) ABSTRACT

A method, apparatus, and system for manufacturing a composite part. A set of reference locations is identified for a set of fiducial markers on a composite ply from a ply shape model for the composite part. The set of fiducial markers is created at the set of reference locations on the composite ply. The composite ply is cut to have a shape defined by the ply shape model.

24 Claims, 13 Drawing Sheets

(56) References Cited

U.S. PATENT DOCUMENTS

| | | | | |
|---|---|---|---|---|
| 2007/0236354 | A1* | 10/2007 | Green | B29C 70/30 |
| | | | | 235/375 |
| 2011/0089591 | A1* | 4/2011 | Gordon | B29C 70/541 |
| | | | | 425/169 |
| 2016/0274564 | A1* | 9/2016 | Schultz | G05B 19/41815 |
| 2016/0297171 | A1* | 10/2016 | Bolsee | B29B 11/16 |
| 2017/0060115 | A1* | 3/2017 | Battles | G05B 19/402 |
| 2018/0290393 | A1* | 10/2018 | Bloch | B32B 38/0004 |
| 2021/0354404 | A1* | 11/2021 | Suriyaarachchi | B29D 99/0014 |
| 2022/0089237 | A1* | 3/2022 | Sverdlov | B25J 9/1697 |
| 2022/0258437 | A1* | 8/2022 | Kremers | B29C 70/386 |
| 2023/0059269 | A1* | 2/2023 | Hollis | B29C 70/542 |

OTHER PUBLICATIONS

Eastmancuts, "Eastman C125 conveyor cutting system—Sunbrella" YouTube video, 2015, screenshot at timestamp 1:05, URL:<https://www.youtube.com/watch?v=Wv5oFu43rOw> (Year: 2015).*
Eastmancuts, "Eastman C125 conveyor cutting system—Sunbrella" YouTube video, 2015, screenshot at timestamp 2:46, URL:<https://www.youtube.com/watch?v=Wv5oFu43rOw> (Year: 2015).*
Eastmancuts, "Eastman C125 conveyor cutting system—Sunbrella" YouTube video, 2015, screenshot at timestamp 5:03, URL:<https://www.youtube.com/watch?v=Wv5oFu43rOw> (Year: 2015).*
Eastman Machine Company, Eagle C125 Cutting Machine Operator's Manual, 2017, URL:<https://www.eastmancuts.com/wp-content/uploads/2019/03/E-579.pdf> (Year: 2017).*
European Patent Office Extended Search Report, dated Jan. 9, 2023, regarding Application No. EP22184624.9, 8 pages.

* cited by examiner

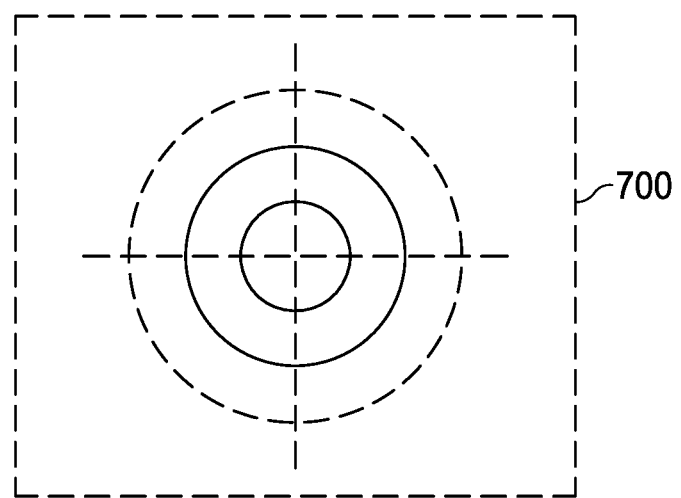
FIG. 7
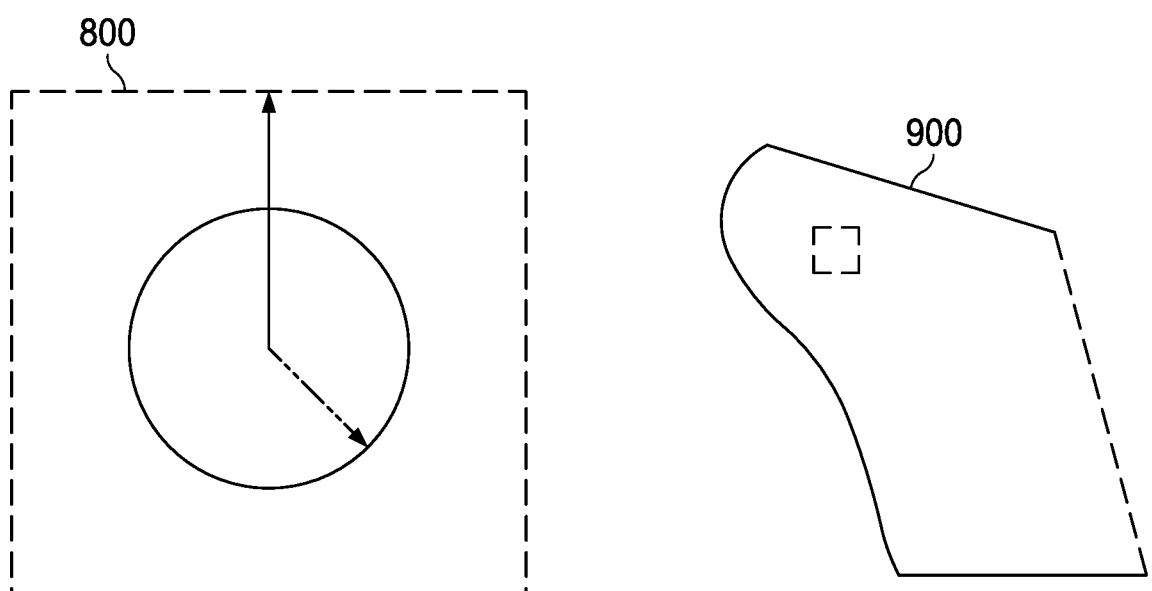
FIG. 8
FIG. 9

PRINTED FIDUCIAL SYSTEM FOR ACCURATE PICK AND PLACE

BACKGROUND INFORMATION

1. Field

The present disclosure relates generally to manufacturing aircraft and in particular, to a method, apparatus, system, and computer program product for manufacturing composite parts for aircraft.

2. Background

Composite materials comprised of carbon fiber can be dry or in a prepreg form in which a resonant is infused in the carbon fiber material. These composite materials can take the form of plies. These plies can be cut into desired shapes and laid up the tool. The plies in the tool can be cured to form a composite part.

This process of forming a composite part involves numerous steps in which a ply is handled. A human operator can lay up a ply in a work area such as a cutter flatbed where a cutter can be applied to a shape with desired dimensions. When the size of the cut is large, a human operator or multiple human operators remove the ply from the scrap material and transport the ply to another location for further processing or storage. This process may involve rolling and folding the ply when acceptable. One further processing is used, the ply may be placed on a tool in which the boundaries of the ply are aligned to laser projections.

This type of processing using human operators can be slower and more tedious than desired. Further, this process is labor-intensive and plies can be easily damaged during handling.

Automated systems can be used to handle the plies. For example, an end effector on a robotic system can perform pick and place operations in which an end effector with adhesion surface, such as a vacuum, can move the plies to different locations and positions the plies for processing. These automated systems can have errors in accurately positioning composite plies during different operations. These errors can result in the final composite part then out of tolerance.

Therefore, it would be desirable to have a method and apparatus that take into account at least some of the issues discussed above, as well as other possible issues. For example, it would be desirable to have a method and apparatus that overcome a technical problem with placing composite plies within the desired tolerances for manufacturing composite parts.

SUMMARY

An embodiment of the present disclosure provides a method for manufacturing a composite part. A set of reference locations is identified for a set of fiducial markers on a composite ply from a ply shape model for the composite part. The set of fiducial markers is created at the set of reference locations on the composite ply. The composite ply is cut to have a shape defined by the ply shape model.

Another embodiment of the present disclosure provides a method for manufacturing a composite part. A composite ply is cut to have a shape defined by a ply shape model for the composite part using automated manufacturing equipment. A set of fiducial markers is created at a set of reference locations on the composite ply using the automated manufacturing equipment.

Yet another embodiment of the present disclosure provides a composite manufacturing system comprising fabrication equipment and a fabrication controller in a computer system. The fabrication controller controls fabrication equipment to identify a set of reference locations for a set of fiducial markers on a composite ply from a ply shape model for a composite part; created the set of fiducial markers at the set of reference locations on the composite ply; and cut the composite ply to have a shape defined by the ply shape model.

Still another embodiment of the present disclosure provides a composite manufacturing system comprising fabrication equipment and a fabrication controller in a computer system. The fabrication controller controls fabrication equipment to cut a composite ply to have a shape defined by a ply shape model for a composite part and create a set of fiducial markers at a set of reference locations on the composite ply.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a fiducial marker in accordance with an illustrative embodiment;

FIG. 8 is an illustration of a fiducial marker in accordance with an illustrative embodiment;

FIG. 9 is another illustration of a fiducial marker in accordance with an illustrative embodiment;

DETAILED DESCRIPTION

Figure 1:
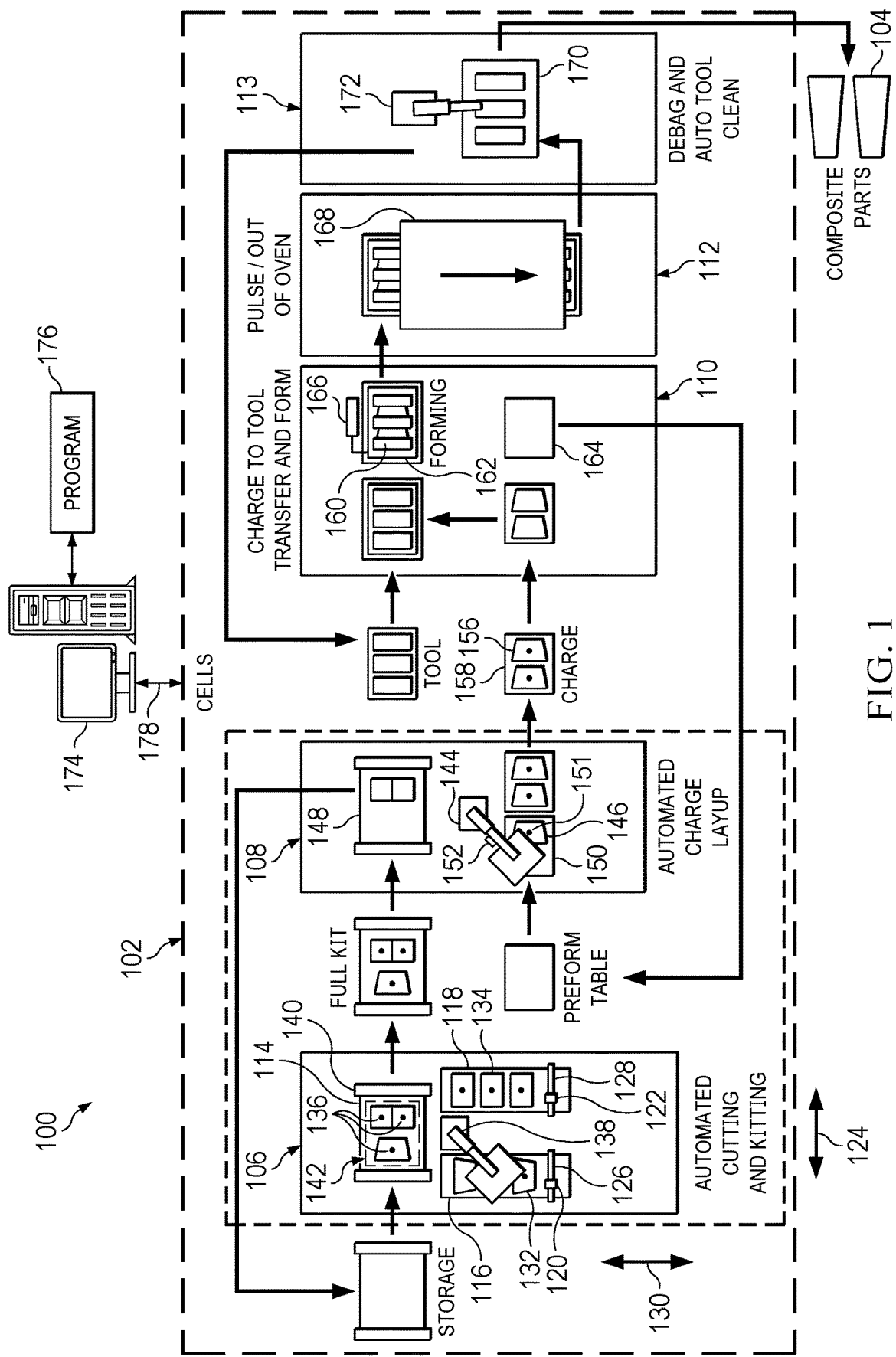
FIG. 1 is an illustration of a composite manufacturing system in accordance with an illustrative embodiment.

The illustrative embodiments recognize and take into account one or more different considerations. For example, the illustrative embodiments recognize and take into account that currently used automation systems or handling composite plies can have errors that are cumulative at different steps such that the final positioning can be out of tolerance. The illustrative embodiments recognize and take into account that these errors can be errors in ply cutter positioning, errors in cutting of the composite material, robot calibration errors, errors in robot alignment to pick areas, and positioning errors in other operations that involve moving or handling composite plies. For example, the illustrative embodiments recognize and take account that positioning errors can also occur during storage unit movement, movement of the ply to a pick zone on a belt, and other types of operations that move or position the composite ply.

The illustrative embodiments recognize and take into account that errors, even small errors, occurring during different operations in which a ply or layup of plies are moved can accumulate resulting in the final positioning being out of tolerance.

The illustrative embodiments recognize and take into account that automated processing of plies involve cutting sheets of composite material to create plies shapes, moving the plies to storage using a robot, placing the plies in storage, picking stored plies, placing the plies on a tool, and other operations. The illustrative embodiments recognize and take into account that these and other operations performed to manufacture composite parts result in the accumulated errors that make maintaining required positional tolerance very difficult.

Illustrative embodiments recognize and take into account that one manner in which errors can be reduced include scanning or identifying a ply boundary for a composite ply while the composite ply is secured to a robot and the factor after a pick operation. Those embodiments recognize and take into account that the scanning of the boundary of the composite ply can be used to determine an as picked position for the composite ply.

The illustrative embodiments recognize and take into account that boundary scanning of plies can remove positional errors from previous operations, but cut quality, cutter calibration, and errors from calculations of the new position often do not provide a level of accuracy that meets tolerances for manufacturing a composite part.

Thus, illustrative embodiments recognize and take into account that creating one or more fiducial markers on a composite ply prior to the composite ply being indexed to a pick area can increase the accuracy in positioning the composite ply during operations performed to manufacture a composite part. The illustrative embodiments recognize and take account that the set of additional markers can have a design that can include a shape or pattern that enables a camera to resolve the position and orientation of a set of fiducial markers. Those embodiments recognize and take account that automated movement of the ply can occur with an inspection using a camera prior to the movement operation to measure the set of fiducial markers with respect to an end effector or other tool that may move or position the composite ply.

The illustrative embodiments recognize and take into account that with the use of the set of fiducial markers, additional error can be avoided as a relative position of the composite ply is recalculated before each operation that moves the composite ply, such as a pick operation.

Illustrative embodiments also recognize and take into account that creating the set of fiducial markers as early as possible can reduce the amount of error. For example, the illustrative embodiments recognize and take account that creating the set of fiducial markers just prior to or subsequent to cutting the composite ply to have a shape for use in forming a composite part. The illustrative embodiments recognize and take into account that forming the set of fiducial markers just before or after cutting the composite ply can also remove error from indexing the cutter belt to move the composite ply to a pick position.

Thus, the illustrative embodiments recognize and take into account that the final position of the composite ply is a combination of the accuracy in marking fiducial markers on the composite ply, final robot accuracy, and tolerances of the boundaries of the composite ply formed from cutting the composite ply.

With reference now to the figures and in particular with reference to FIG. 1, an illustration of a composite manufacturing system is depicted in accordance with an illustrative embodiment. Composite manufacturing system 100 in composite can operate cells 102 to manufacture composite parts 104. In this illustrative example, composite parts 104 can take a number of different forms. For example, composite parts 104 can be selected from at least one of a skin panel, a stringer, a door, a nacelle, or other suitable type of composite part.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, composite manufacturing system 100 comprises a number of different cells that operate to fabricate composite parts 104. As depicted, cells 102 in composite manufacturing system 100 can comprise, for example, cutting and kitting cell 106, automated charge layup cell 108, charge to tool transfer and forming cell 110, curing cell 112, and cleaning cell 113.

As depicted, cutting and kitting cell 106 is a cell in composite manufacturing system 100 that operates to create composite plies 114 for use in manufacturing composite parts 104. In this illustrative example, cutting and kitting cell 106 automatically performs cutting operations using automated cutting and marking machine 116 and automated cutting and marking machine 118. As depicted, automated cutting and marking machine 116 and automated cutting and marking machine 118 can be cutting beds, automated flatbed cutting systems, conveyor cutting beds, or other suitable types of automated cutting and marking machines. In the illustrative example, a marking functionality combined with a cutting function by using multifunction tools in these cutting machines can modify the cutting machines to function as cutting and marking machines. The cutting and marking machines can be, for example, computer numerical control (CNC) machines.

In this illustrative example, automated cutting and marking machine 116 has multifunction tool 120, and automated cutting and marking machine 118 has multifunction tool 122. In this illustrative example, multifunction tool 120 and multifunction tool 122 are integrated tools in which each of these tools has a cutter (not shown) and a marker (not shown). The cutter can take a number of different forms. For example, the cutter can be an electric oscillating knife, a drag knife, ultrasonic knife, a laser cutter, or some other suitable type of device that can cut composite materials to form composite plies 114 with a shape for manufacturing composite parts 104. The marker can be an inkjet printer, a pen, a sticker applicator, or some other device that can mark on composite plies 114.

As depicted, multifunction tool 120 can move in the direction of arrow 124 along gantry 126. Multifunction tool 122 can also move in the direction of arrow 124 on gantry 128. Additionally, gantry 126 can move in the direction of arrow 130 on flatbed 132 of automated cutting and marking machine 116. In similar fashion, gantry 128 can move in the direction of arrow 130 on flatbed 134 of automated cutting and marking machine 118. In this illustrative example, flatbed 132 and flatbed 134 can be beds with moving conveyor belts.

In addition to cutting composite plies 114, multifunction tool 120 and multifunction tool 122 can also mark composite plies 114 to create fiducial markers 136 on composite plies 114.

As depicted, pick and place robot 138 can move composite plies 114 with fiducial markers 136 from automated cutting and marking machine 116 and automated cutting and marking machine 118 to storage 140 to form kit 142. In this illustrative example, pick and place robot 138 can detect fiducial markers 136 on composite plies 114 when picking up composite plies 114 from flatbed 132 and flatbed 134 and placing composite plies 114 onto storage 140. Pick and place robot 138 can include the camera system (not shown) to detect fiducial markers 136 on composite plies 114.

As depicted, kit 142 contains the composite plies 114 with shapes needed to form a composite part in composite parts 104. In this illustrative example, storage 140 can be a cart or other mobile platform that can be moved automatically or by a human operator. Storage 140 enables moving composite plies 114 to other cells for additional processing to manufacture composite parts 104.

As depicted, storage 140 can move composite plies 114 to charge layup cell 108 for further processing. In this illustrative example, pick and place robot 144 picks up composite ply 146 from storage 148 and places composite ply 146 onto preform table 150. In this illustrative example, pick and place robot 144 can include camera 152 that detects fiducial marker 151 on composite ply 146 for use in picking up composite ply 146 from storage 148 and placing composite ply 146 onto preform table 150.

With the use of fiducial marker 151, composite ply 146 can be placed on preform table 150 with a desired level of tolerance. In this illustrative example, preform table 150 is a carrier for composite plies and can take the form of a grid that is composed of metallic strips bonded in a grid fashion.

Although pick and place robot 138 can also move composite plies 114 with a desired level tolerance using fiducial markers 136, that type of placement can be optional with the use of pick and place robot 144 in charge layup cell 108. In other words, the use of fiducial marker 151 to place composite ply 146 onto preform table 150 can be used to reduce or eliminate the effect of other positional errors occurring from other movement of composite ply 146 on flatbed 132, on storage 148 by pick and place robot 138, and other movement of these composite plies.

In this illustrative example, charge layup cell 108 is an example of a cell in which errors from prior movement can be reduced or eliminated. In this depicted example, errors can be reduced or eliminated when placing composite ply 146 onto preform table 150 using fiducial marker 151.

The layup of composite plies can be performed to form a charge, such as charge 156 on preform table 158. Preform table 158 can be moved to move charge to tool transfer and forming cell 110.

As depicted, charge 160 has been moved onto tool 162 from preform table 164. In this illustrative example, a resin can be infused into charge 160 from resin reservoir 166. The addition of resin can be optional when a prepreg is used.

Tool 162 with charge 160 infused with resin can be moved into autoclave 168 in curing cell 112. Thereafter, composite parts 104 can be removed from tool 170 by robotic arm 172 in cleaning cell 113. In this cell, operations such as the bagging and tool cleaning of tool 170 can be performed such that tool 170 can be cleaned for further use.

In this illustrative example, computer 174 can run program 176 to control the different cells in composite manufacturing system 100 to automatically perform operations to manufacture composite parts 104. As depicted, computer 174 can communicate with computers or other control devices for (not shown) the manufacturing equipment in cells 102 using communications link 178. Communications link 178 can be at least one of a physical connection or a wireless connection.

Thus, the illustrative examples can create fiducial markers 136 directly on composite plies 114 prior to composite plies 114 being indexed in cutting and kitting cell 106 for movement by a pick and place robot, such as pick and place robot 138 and pick and place robot 144. From the time that fiducial markers 136 are created on composite plies 114, subsequent movement of composite plies 114 can be performed using a camera on the pick and place robot to resolve the position of composite plies 114 with respect to an end effector on the pick and place robot. In this manner, the positioning of the end effector with respect to fiducial markers 136 can be determined with a desired level of accuracy using fiducial markers 136.

Subsequent operations moving composite plies 114 do not introduce additional error as the relative position of composite plies 114 can be determined before each operation moving composite plies 114.

Figure 2:
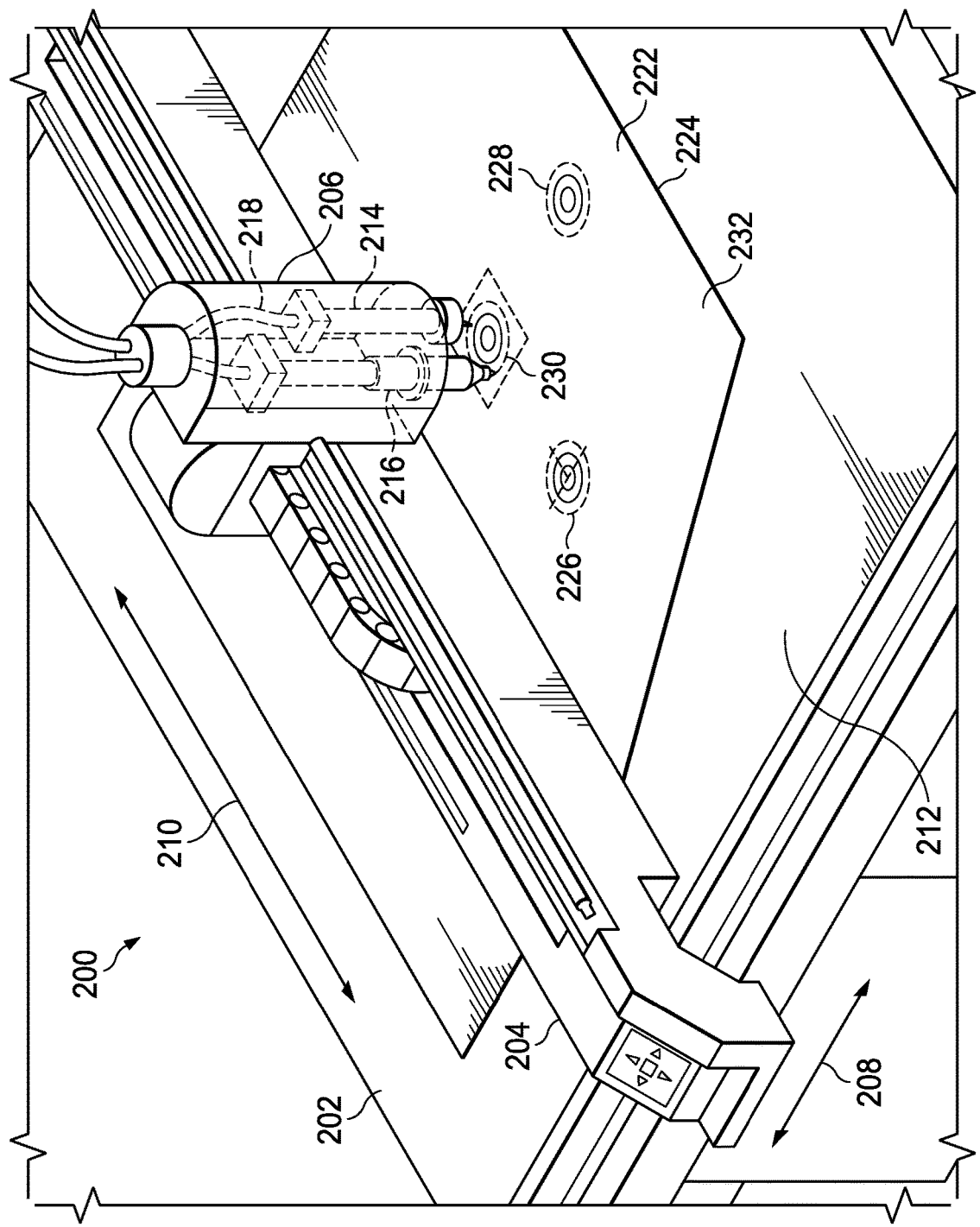
FIG. 2 is an illustration of an automated cutting and marking machine in accordance with an illustrative embodiment.

Turning next to FIG. 2, an illustration of an automated cutting and marking machine is depicted in accordance with an illustrative embodiment. As depicted, automated cutting and marking machine 200 is an example of one implementation for automated cutting and marking machine 116 and automated cutting and marking machine 118 in FIG. 1.

In this illustrative example, automated cutting and marking machine 200 comprises flatbed 202, gantry 204, multifunction tool 206. As depicted, multifunction tool 206 is movably attached to gantry 204. Gantry 204 is movably attached to flatbed 202.

In this illustrative example, gantry 204 is a bridge like overhead structure that supports multifunction tool 206. As depicted, gantry 204 can move along flatbed 202 in the direction of arrow 208. In this example, multifunction tool 206 can move along gantry 204 in the direction of arrow 210. As result, multifunction tool 206 can be moved in two dimensions represented by arrow 208 and arrow 210 over surface 212 of flatbed 202.

In this illustrative example, multifunction tool 206 can comprise two components. These components can be a cutter 214 and marker 216. As depicted, cutter 214 and marker 216 are mounted within housing 218 of multifunction tool 206. Housing 218 of multifunction tool 206 is movably connected to gantry 204.

As depicted, automated cutting and marking machine 200 can be programmed to cut composite ply 222 into shape 224 and generate fiducial markers, such as fiducial marker 226, fiducial marker 228, and fiducial marker 230, on surface 232 of composite ply 222. These fiducial markers are examples of an implementation for fiducial markers 136 and fiducial marker 151 in FIG. 1.

In this illustrative example, cutter 214 has cut composite ply 222 to have shape 224. As depicted, composite ply 222 has been cut to have shape 224 prior to the creation of fiducial markers. In this illustrative example, fiducial marker 226 and fiducial marker 228 have been created on surface 232 by marker 216. In this example, marker 216 has not yet completed creation of fiducial marker 230 on surface 232 of composite ply 222.

Figure 3:
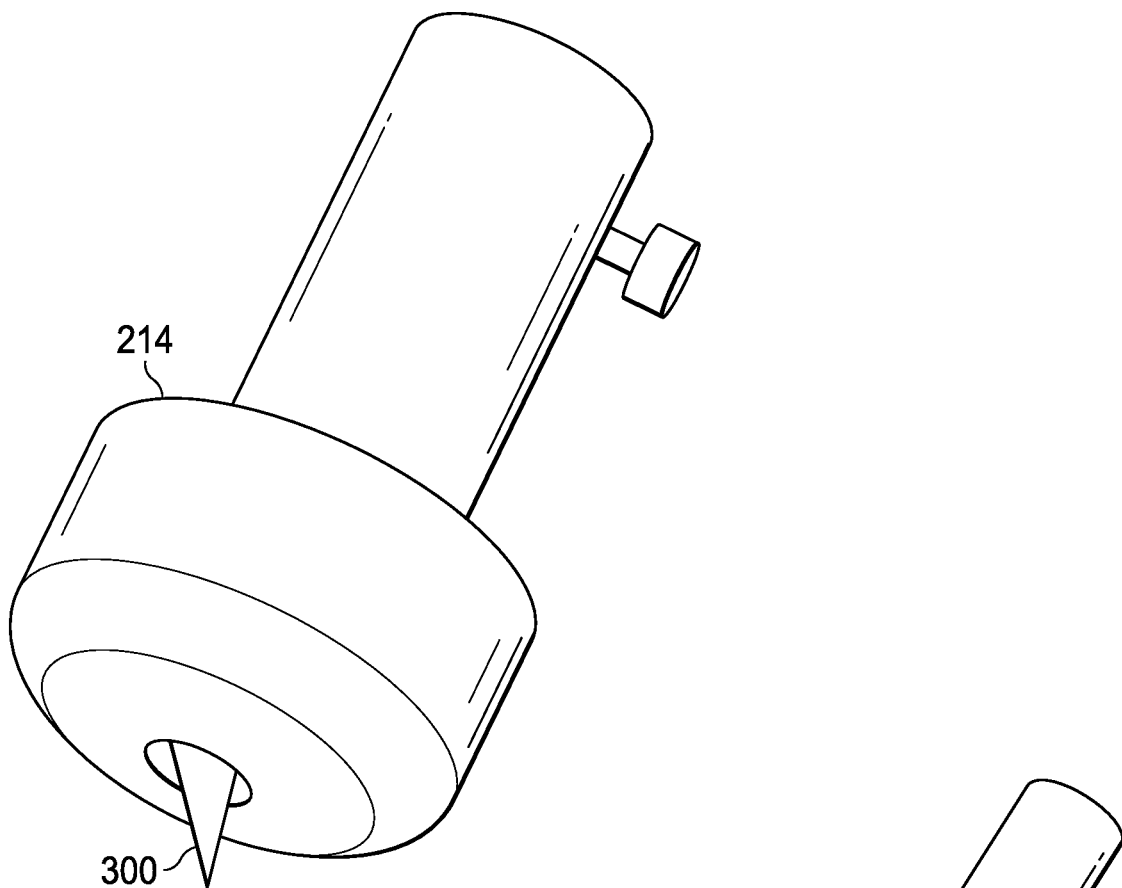
FIG. 3 is an illustration of a cutter in the multifunction tool in FIG. 2 in accordance with an illustrative embodiment.

Turning to FIG. 3, an illustration of a cutter in the multifunction tool in FIG. 2 is depicted in accordance with an illustrative embodiment. In this illustrative example, cutter 214 takes the form of drag blade 300. The illustration of cutter 214 as drag blade 300 is provided as one example of an implementation for cutter 214. This illustrative example is not meant to limit the types of cutters that may be used in other illustrative examples. For example, cutter 214 can also be implemented using an electric oscillating knife, an ultrasonic knife, a laser cutter, a kit cutting machine, a driven rotary blade, or other suitable type of cutter.

Figure 4:
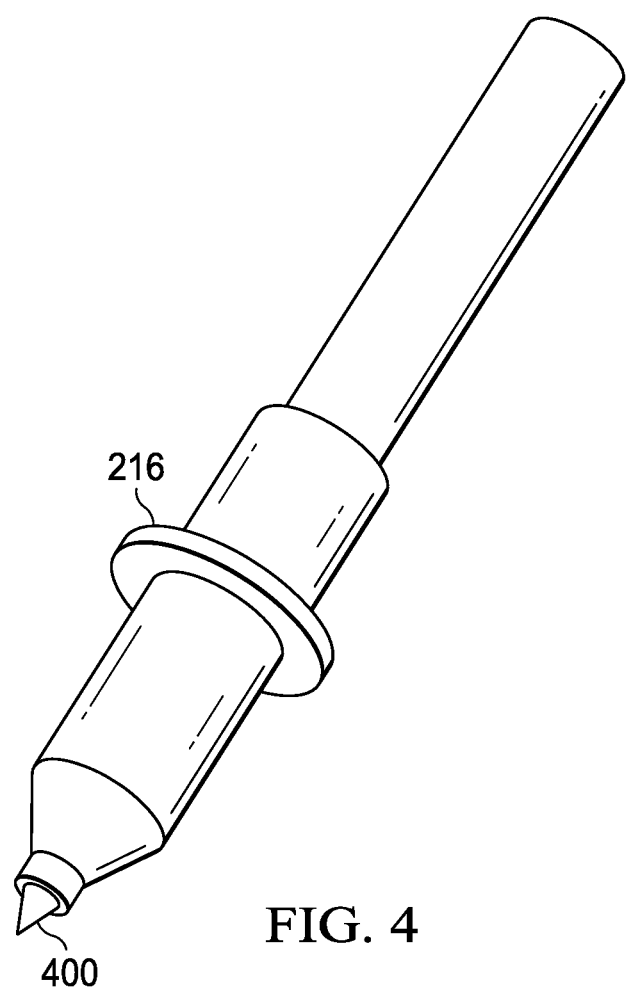
FIG. 4 is an illustration of a marker in the multifunction tool in FIG. 2 in accordance with an illustrative embodiment.

With reference to FIG. 4, an illustration of a marker in the multifunction tool in FIG. 2 is depicted in accordance with an illustrative embodiment. As depicted, marker 216 takes the form of ink pen 400.

The illustration of marker 216 as ink pen 400 is provided as one example of an implementation for marker 216. This illustrative example is not meant to limit the types of markers that may be used in other illustrative examples. For example, marker 216 can also be implemented using inkjet printer, a sticker applicator, or some other device that can mark on surface 232 of composite ply 222.

Figure 5:
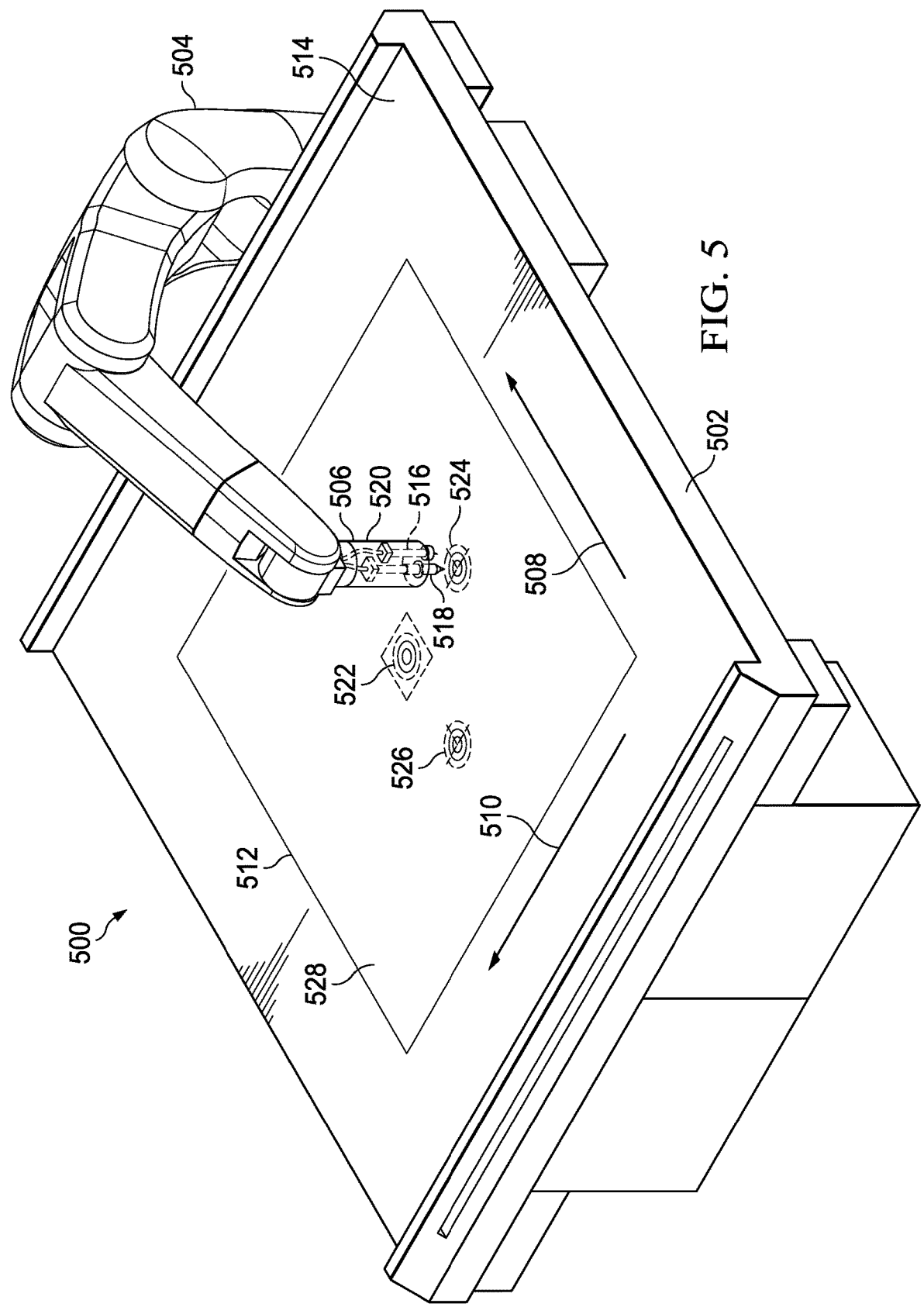
FIG. 5 is an illustration of an automated cutting and marking machine in accordance with an illustrative embodiment.

Turning now to FIG. 5, an illustration of an automated cutting and marking machine is depicted in accordance with an illustrative embodiment. As depicted, automated cutting and marking machine 500 is an example of another type of automated cutting and marking machine that can be used in place of the automated cutting and marking machine 116 and automated cutting and marking machine 118 depicted in FIG. 1.

In this illustrative example, automated cutting and marking machine 500 comprises platform 502, robotic arm 504, and end effector 506. In this example, robotic arm 504 can move end effector 506 in three dimensions, including a plane defined by x axis 508 and y axis 510.

Composite ply 512 is located on surface 514 of platform 502. In this example, end effector 506 is a multifunction tool including cutter 516 and marker 518 as shown in this exposed view of housing 520 for end effector 506.

As depicted, robotic arm 504 can move end effector 506 to create fiducial marker 522, fiducial marker 524, and fiducial marker 526 on surface 528 of composite ply 512 using marker 518. These fiducial markers is an example of an implementation for fiducial markers 136 and fiducial marker 151 in FIG. 1.

As depicted, composite ply 512 has not been cut by cutter 516 in end effector 506. As can be seen in this example, fiducial markers are created prior to cutting composite ply 512.

Figure 6:
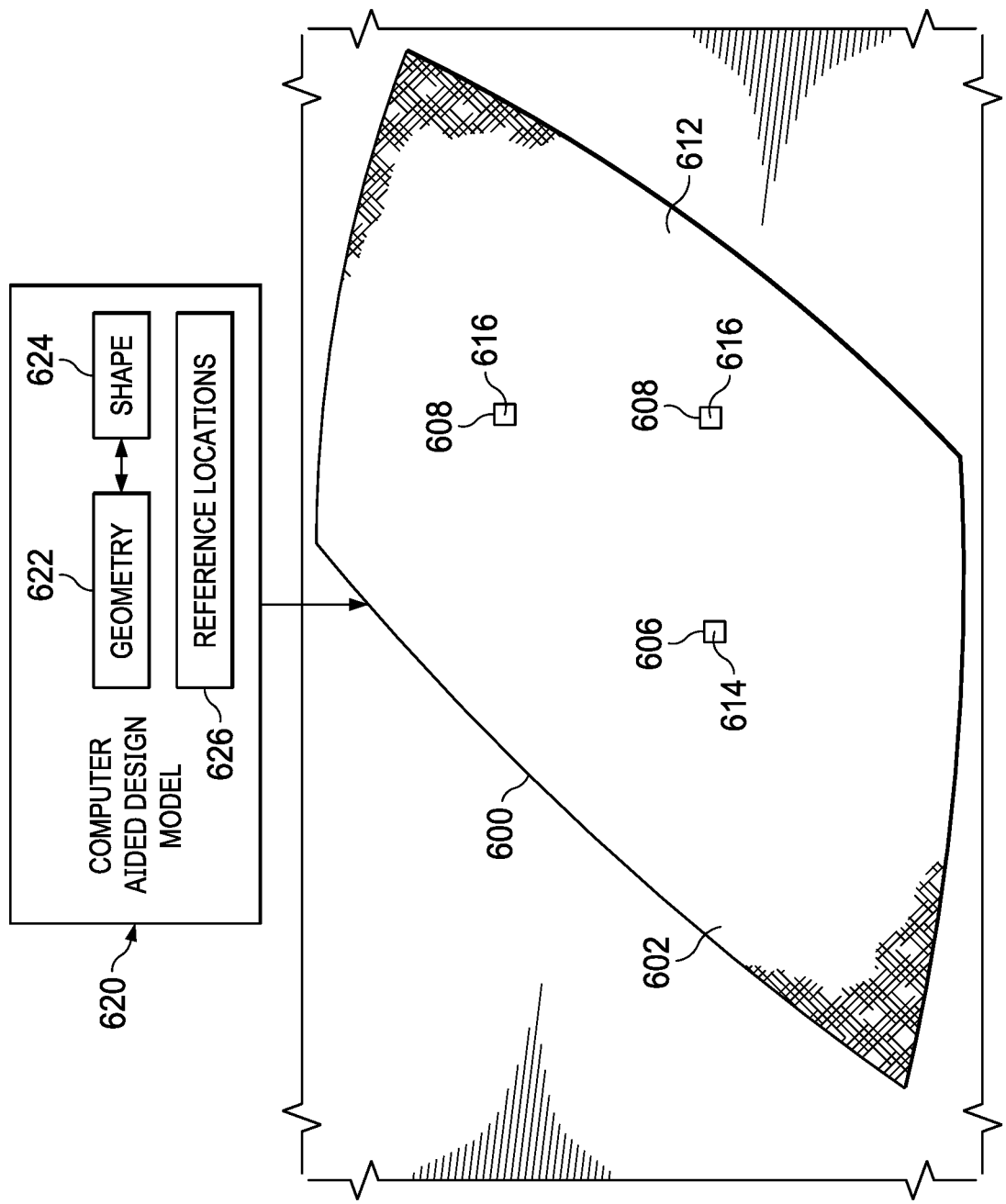
FIG. 6 is an illustration of a composite ply with fiducial markers in accordance with an illustrative embodiment.

With reference next to FIG. 6, an illustration of a composite ply with fiducial markers is depicted in accordance with an illustrative embodiment. As depicted, composite ply 600 is comprised of carbon fibers and can be cut into shape 602.

In this illustrative example, fiducial marker 606, fiducial marker 608, and fiducial marker 610 have been created on surface 612 of composite ply 600.

In this example, fiducial marker 606 has been created at reference location 614, fiducial marker 608 has been created at reference location 616, and fiducial marker 610 has been created at reference location 618.

These reference locations can be identified from computer-aided design (CAD) model 620 of composite ply 600. In this illustrative example, computer-aided design model 620 specifies geometry 622 for shape 624 for composite ply 600. Geometry 622 can be used to cut composite ply 600 to have shape 602 with desired dimensions.

Computer-aided design model 620 also includes reference locations 626 with respect to geometry 622. Reference locations 626 can be used to create fiducial marker 606 at reference location 614, fiducial marker 608 at reference location 616, and fiducial marker 610 at reference location 618 on composite ply 600.

Turning to FIG. 7, an illustration of a fiducial marker is depicted in accordance with an illustrative embodiment.

Fiducial marker 700 is an example of one implementation for fiducial marker 136 and fiducial marker 151 in FIG. 1, and fiducial marker 606, fiducial marker 608, and fiducial marker 610 in FIG. 6. As depicted, fiducial marker 700 has a symmetric shape.

Turning to FIG. 8, an illustration of a fiducial marker is depicted in accordance with an illustrative embodiment. Fiducial marker 800 is an example of one implementation for fiducial marker 136 and fiducial marker 151 in FIG. 1, and fiducial marker 606, fiducial marker 608, and fiducial marker 610 in FIG. 6. As depicted, fiducial marker 800 has a symmetric shape.

With reference to FIG. 9, another illustration of a fiducial marker is depicted in accordance with an illustrative embodiment. Fiducial marker 900 is an example of one implementation for fiducial marker 136 and fiducial marker 151 in FIG. 1, and fiducial marker 606, fiducial marker 608, and fiducial marker 610 in FIG. 6. As depicted, fiducial marker 900 has an asymmetric shape.

The illustration of fiducial marker 700 in FIG. 7, fiducial marker 800 in FIG. 8, and fiducial marker 900 in FIG. 9 are presented as nonlimiting examples of fiducial markers that may be used in the different illustrative examples. The presentation of these fiducial markers is not meant to limit the manner in which other fiducial markers may be implemented in other illustrative examples. For example, in some illustrative examples a fiducial marker may have multiple colors. In yet other illustrative examples, fiducial marker may have other shapes or sizes in addition to or in place of the ones depicted in these examples. The particular shape and size of fiducial markers can be selected to increase the ability of a sensor to detect fiducial marker and its orientation.

Figure 10:
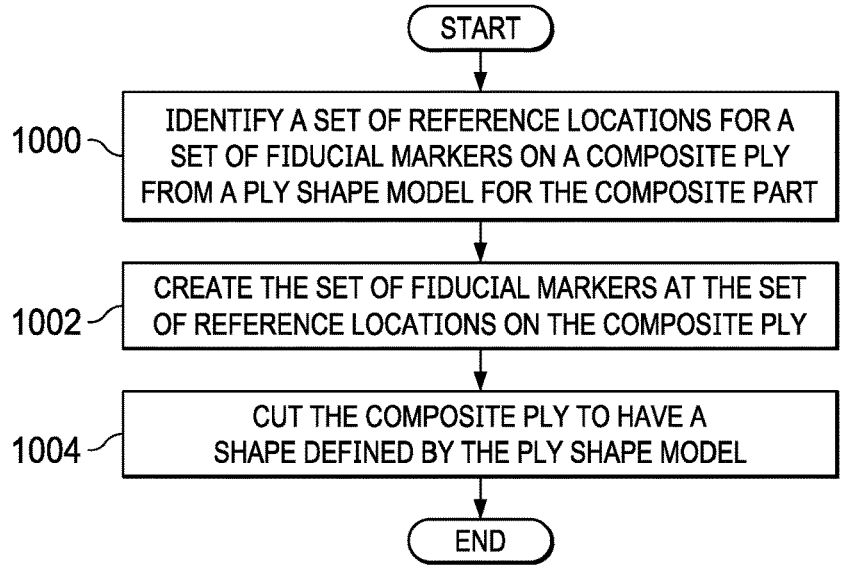
FIG. 10 is an illustration of a flowchart of a process for manufacturing a composite part in accordance with an illustrative embodiment.

Turning next to FIG. 10, an illustration of a flowchart of a process for manufacturing a composite part is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in computer 174 running program 176 in FIG. 1.

The process begins by identifying a set of reference locations for a set of fiducial markers on a composite ply from a ply shape model for the composite part (operation 1000). The process forms the set of fiducial markers at the set of reference locations on the composite ply (operation 1002).

The process cuts the composite ply to have a shape defined by the ply shape model (operation 1004). The process terminates thereafter.

In this illustrative example, operation 1002 and operation 1004 can be performed using the same tool. In other words, cutting the composite ply and the creating of the set of fiducial markers at the set of reference locations on the composite ply can be formed using a single tool. For example, an end effector for a robotic arm having both a cutter and a marker can be present. In another example, the tool can be a multifunction tool head that moves along one axis on a gantry with a gantry moving on another axis.

Figure 11:
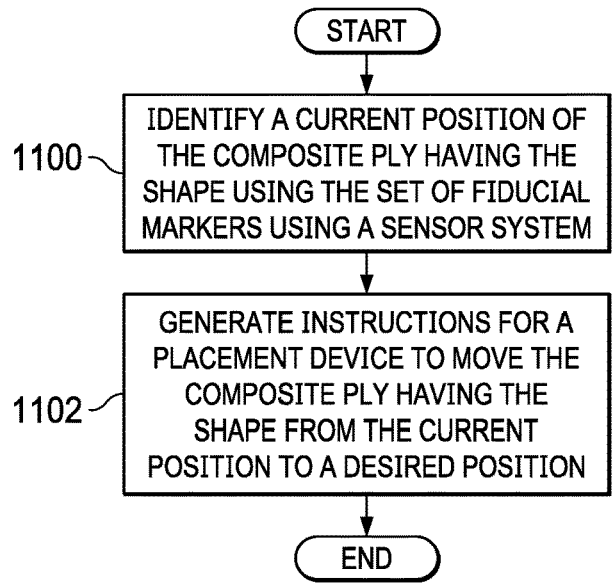
FIG. 11 is an illustration of a flowchart of a process for performing manufacturing operation in accordance with an illustrative embodiment.

With reference to FIG. 11, an illustration of a flowchart of a process for performing manufacturing operation is depicted in accordance with an illustrative embodiment. The process illustrated in FIG. 11 is an example of an additional operation that can be performed with the operations depicted in the flowchart in FIG. 10.

The process performs identifies a current position of the composite ply having the shape using the set of fiducial markers using a sensor system (operation 1100). The process generates instructions for a placement device to move the composite ply having the shape from the current position to a desired position (operation 1102). The process terminates thereafter.

Figure 12:
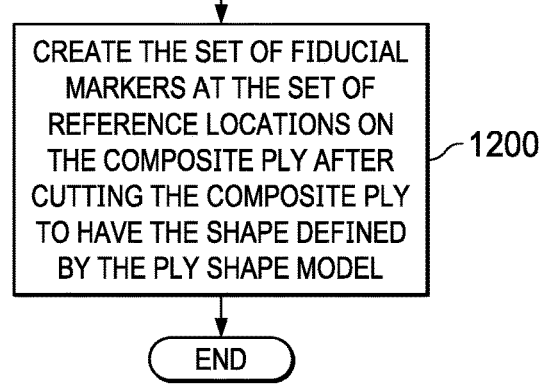
FIG. 12 is an illustration of a flowchart of a process for creating a set of fiducial markers in accordance with an illustrative embodiment.

Turning now to FIG. 12, an illustration of a flowchart of a process for creating a set of fiducial markers is depicted in accordance with an illustrative embodiment. The operation illustrated in FIG. 12 is an example one implementation for operation 1002 in FIG. 10.

The process creates the set of fiducial markers at the set of reference locations on the composite ply after cutting the composite ply to have the shape defined by the ply shape model (operation 1200). The process terminates thereafter.

Figure 13:
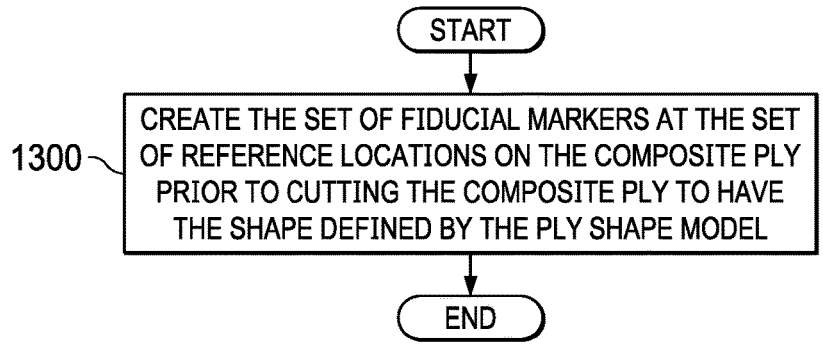
FIG. 13 is another illustration of a flowchart of a process for creating a set of fiducial markers in accordance with an illustrative embodiment.

Turning now to FIG. 13, another illustration of a flowchart of a process for creating a set of fiducial markers is depicted in accordance with an illustrative embodiment. The operation illustrated in FIG. 13 is an example one implementation for operation 1002 in FIG. 10.

The process creates the set of fiducial markers at the set of reference locations on the composite ply prior to cutting the composite ply to have the shape defined by the ply shape model (operation 1300). The process terminates thereafter.

Figure 14:
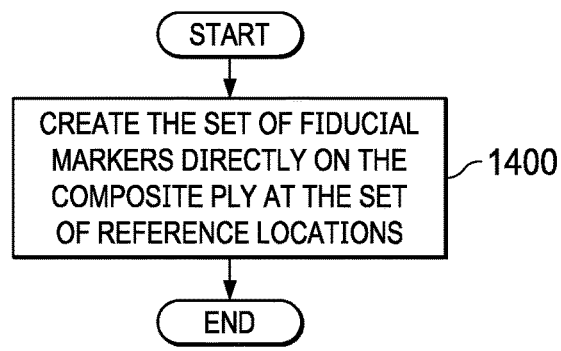
FIG. 14 is an illustration of a flowchart of a process for creating a set of fiducial markers in accordance with an illustrative embodiment.

With reference next to FIG. 14, an illustration of a flowchart of a process for creating a set of fiducial markers is depicted in accordance with an illustrative embodiment. The operation illustrated in FIG. 14 is an example one implementation for operation 1002 in FIG. 10.

The process creates the set of fiducial markers directly on the composite ply at the set of reference locations (operation 1400). The process terminates thereafter.

Figure 15:
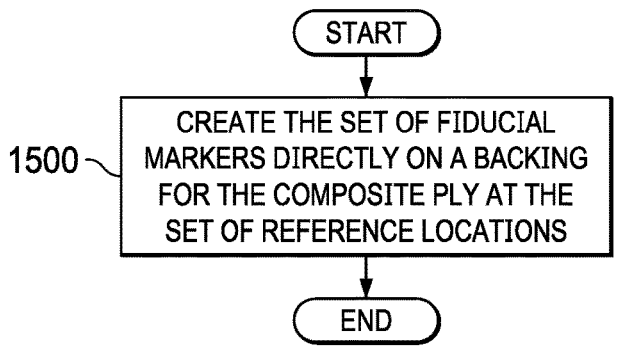
FIG. 15 is an illustration of a flowchart of a process for creating a set of fiducial markers in accordance with an illustrative embodiment.

Turning to FIG. 15, an illustration of a flowchart of a process for creating a set of fiducial markers is depicted in accordance with an illustrative embodiment. The operation illustrated in FIG. 15 is an example one implementation for operation 1002 in FIG. 10.

The process creates the set of fiducial markers directly on a backing for the composite ply at the set of reference locations (operation 1500). The process terminates thereafter.

Figure 16:
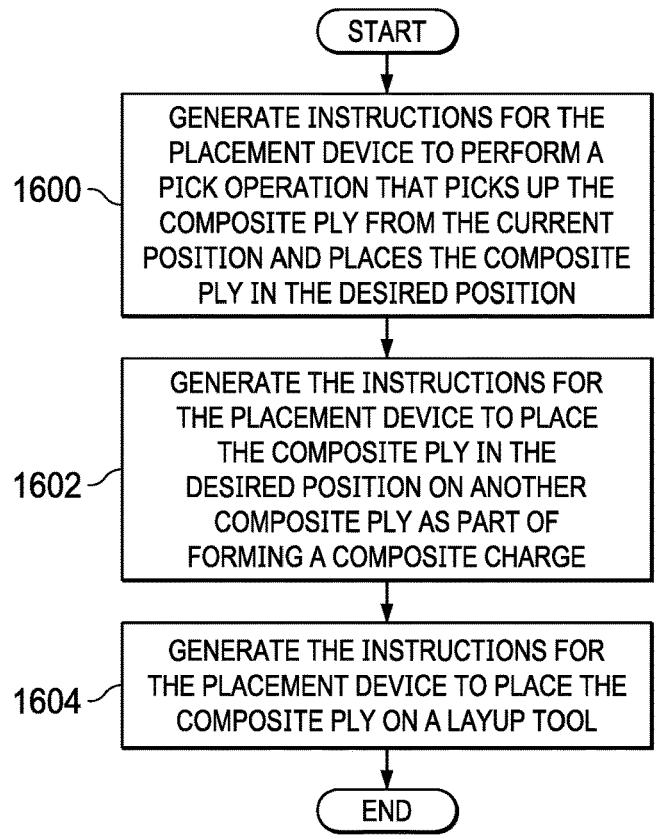
FIG. 16 is an illustration of a flowchart of a process for performing a set of manufacturing operations in accordance with an illustrative embodiment.

With reference next to FIG. 16, an illustration of a flowchart of a process for performing a set of manufacturing operations is depicted in accordance with an illustrative embodiment. The operations illustrated in FIG. 16 are examples of implementations for operation 1102 in FIG. 11.

The process generates instructions for the placement device to perform a pick operation that picks up the composite ply from the current position and places the composite ply in the desired position (operation 1600). The process generates the instructions for the placement device to place the composite ply in the desired position on another composite ply as part of forming a composite charge (operation 1602).

The process generates the instructions for the placement device to place the composite ply on a layup tool (operation 1604). The process terminates thereafter.

Figure 17:
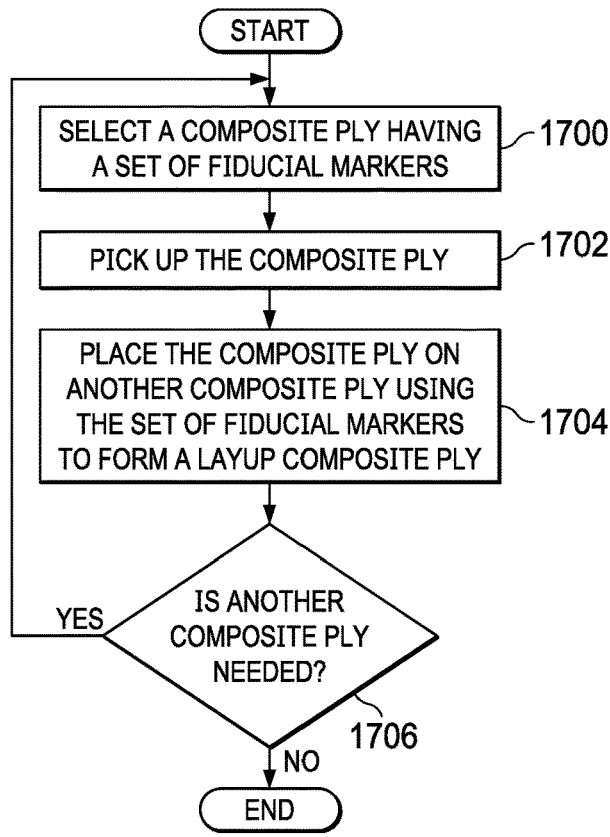
FIG. 17 is an illustration of a flowchart of a process for performing a set of manufacturing operations in accordance with an illustrative embodiment.

Turning to FIG. 17, an illustration of a flowchart of a process for performing a set of manufacturing operations is depicted in accordance with an illustrative embodiment. The process illustrated in FIG. 17 is an example of an additional operations that can be performed with the operations depicted in the flowchart in FIG. 10.

The process begins by selecting a composite ply having a set of fiducial markers (operation 1700). The process picks up the composite ply (operation 1702). The process places the composite ply on another composite ply using the set of fiducial markers to form a layup composite ply (operation 1704). In operation 1704, the set of fiducial markers can be used to place the composite ply on another composite ply with a desired position for the layup of composite plies being formed.

A determination is made as to whether another composite ply is needed (operation 1706). If another composite poly is needed, the process returns to operation 1700 to select another composite ply for the layup of composite plies. Otherwise, the process terminates.

Thus, the manufacturing operation performed in FIG. 17, can be used to lay up a composite ply, a stack of composite plies, a charge, a composite preform, or other structure using composite plies or other composite materials. By using composite plies with a set of fiducial markers, the placement of each composite ply relative to a previously placed composite ply can be performed with the desired level of accuracy. This accuracy can reduce the need to rework or discarding of composite parts made from the composite plies laid up using fiducial markers.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram. For example, although forming the set of additional markers in operation 1002 is shown as being performed before cutting the composite ply in operation 1004 in FIG. 10, these operations can be performed in reverse order. As another example, the different operations illustrated in FIG. 16 can be performed in different orders from the one depicted in the flowchart in FIG. 17. Additionally, two or more of these operations can be performed in parallel.

Figure 18:
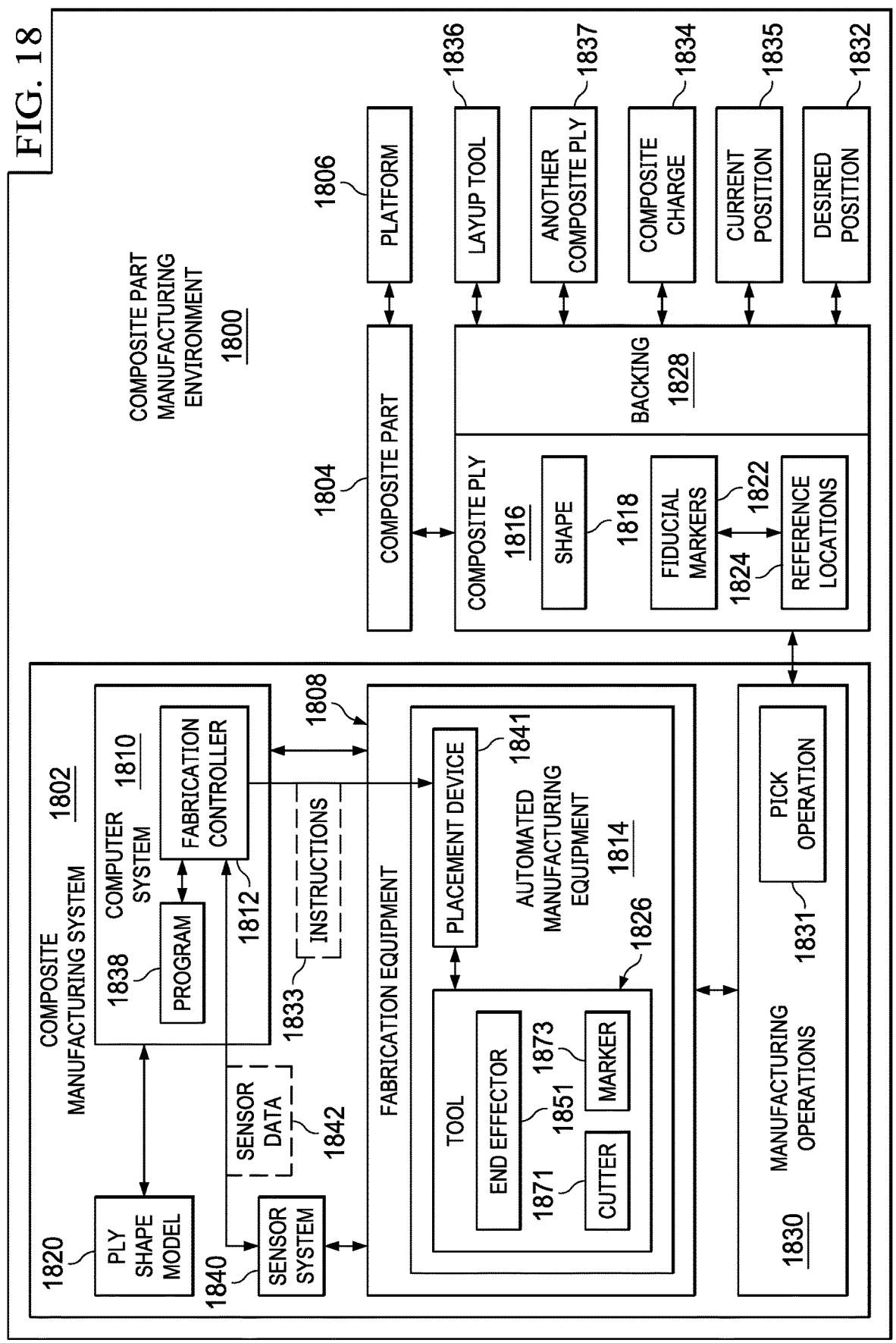
FIG. 18 is an illustration of a block diagram of a composite part manufacturing environment in accordance with an illustrative embodiment.

With reference now to FIG. 18, an illustration of a block diagram of a composite part manufacturing environment is depicted in accordance with an illustrative embodiment. The different components and operations shown and described in FIGS. 1-17 can be implemented in composite part manufacturing environment 1800.

In this illustrative example, composite manufacturing system 1802 can operate to manufacture composite part 1804 for platform 1806. As depicted, composite manufacturing system 100 in FIG. 1 is one implementation of fabrication equipment 1808 in composite manufacturing system 1802.

In this illustrative example, platform 1806 can take a number. For example, platform 1806 can be selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable types of platforms.

Composite part 1804 for platform 1806 can also take a number of different forms. For example, composite part 1804 can be selected from at least one of a skin panel, a stringer, a wing, a wing box, a nacelle, a fuselage section, a door, a panel, a control surface, a vertical stabilizer, a horizontal stabilizer, a rudder, and elevator, aileron, a vehicle hood, a wall panel, a pipe, a composite sandwich panel, and other suitable types of composite parts for use in platform 1806.

In this illustrative example, composite manufacturing system 1802 comprises a number of different components. As depicted, composite manufacturing system 1802 includes fabrication equipment 1808, computer system 1810, and fabrication controller 1812.

Fabrication equipment 1808 is physical equipment and can include physical machines or devices that can be used to perform operations in manufacturing composite part 1804. In this illustrative example, fabrication equipment 1808 can include automated manufacturing equipment 1814. Automated manufacturing equipment 1814 is a hardware system and can include software. Automated manufacturing equipment can perform tasks without needing input or instructions from a human operator. Automated manufacturing equipment 1814 can include circuits such as a processor unit, an application specific integrated circuit (ASIC), or other hardware that is configured or designed to enable performance of the tasks. This hardware can be programmable and can be, for example, a computer numeric control (CNC) machine.

For example, automated manufacturing equipment 1814 can be a machine that cuts composite ply 1816. For example, automated manufacturing equipment 1814 can be a cutting machine that employs a cutter such as an electric oscillating knife, an ultrasonic knife, a laser cutter, a kit cutting machine, a drag knife, a driven rotary blade, or other suitable type of machine that can be automated to cut composite ply 1816.

As another example, automated manufacturing equipment 1814 can still be an automated fiber placement (AFP) machine such as a pick and place robot that operates to move or position composite ply 1816. In another illustrative example, automated manufacturing equipment 1814 can be an inkjet printer or ink jet robot that can print on composite ply 1816.

In yet another example, automated manufacturing equipment 1814 can be a multifunction machine. For example, automated manufacturing equipment 1814 can perform cutting and marking operations. For example, automated manufacturing equipment 1814 can comprise a flatbed with a gantry having a multifunction tool having a cutter and a marker.

In this illustrative example, composite ply 1816 can be comprised of fibers in which resin can be infused and cured to form composite part 1804. In the illustrative examples, composite ply 1816 can already have resin infused such that composite ply 1816 can be a layer of prepreg.

These fibers can be, for example, a carbon fiber. The fibers can also be used in addition to or in place of the carbon fiber, such as fiberglass fibers, para-aramid fibers, aramid fibers, or other suitable fibers that can be used to form composite ply 1816. In an illustrative example, many layers of composite by 1816 can be laid out in different orientations and cured different shapes to form composite part 1804. Composite ply 1816 can be laid up by itself or with other plies to form a face sheet with a core material between the two face sheets to form a composite sandwich for composite part 1804.

In the illustration of example, fabrication equipment 1808 can also include a charge layup system, a conveyor, an autoclave, an oven, a lathe, a paint application system, or other suitable pieces of equipment that can be operated to manufacture composite part 1804. These other types of fabrication equipment 1808 may or may not be automated.

As depicted, fabrication controller 1812 is located in computer system 1810. Fabrication controller 1812 can be implemented in software, hardware, firmware, or a combination thereof. When software is used, the operations performed by fabrication controller 1812 can be implemented in program code configured to run on hardware, such as a processor unit. When firmware is used, the operations performed by fabrication controller 1812 can be implemented in program code and data and stored in persistent memory to run on a processor unit. When hardware is employed, the hardware can include circuits that operate to perform the operations in fabrication controller 1812.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, a "number of" when used with reference items means one or more items. For example, a number of operations is one or more operations.

Computer system 1810 is a physical hardware system and includes one or more data processing systems. When more than one data processing system is present in computer system 1810, those data processing systems are in communication with each other using a communications medium. The communications medium can be a network. The data processing systems can be selected from at least one of a computer, a server computer, a tablet computer, or some other suitable data processing system. Computer system 1810 can be configured to perform at least one of the steps, operations, or actions described in the different illustrative examples using software, hardware, firmware, or a combination thereof.

In this illustrative example, program 1838 can be example of an implementation for fabrication controller 1812 when fabrication controller 1812 takes the form of software.

In this illustrative example, fabrication controller 1812 can perform one or more of the different operations illustrated in the flowcharts in FIGS. 10-17.

As depicted, fabrication controller 1812 can control fabrication equipment 1808 to cut composite ply 1816 to have shape 1818 defined by ply shape model 1820 for composite part 1804 using automated manufacturing equipment 1814. In this illustrative example, ply shape model 1820 is information readable by fabrication controller 1812. Ply shape model 1820 can be, for example, a computer-aided design (CAD) model that defines shape 1818 for composite ply 1816.

Additionally, ply shape model 1820 can also identify a set of reference locations 1824 on composite ply 1816. As used herein, a "set of" when used with reference to items means one or more items. For example, a set of reference locations is one or more reference locations.

Thus, with this information, ply shape model 1820 contains information that can be used to cut composite ply 1816, create a set of fiducial markers 1822 on composite ply 1816, or both cut composite ply 1816 and create a set of fiducial markers on composite ply 1816.

Fabrication controller 1812 can control fabrication equipment 1808 to create a set of fiducial markers 1822 at the set of reference locations 1824 on composite ply 1816 using automated manufacturing equipment 1814. In this illustrative example, fabrication controller 1812 can identify the set of reference locations 1824 for the set of fiducial markers 1822 on composite ply 1816 from ply shape model 1820 for composite part 1804.

In illustrative example, composite ply 1816 can be cut to add shape 1818 defined by ply shape model 1820 using tool 1826 in automated manufacturing equipment 1814 and the set of fiducial markers 1822 can be created at the set of reference locations 1824 with tool 1826. For example, tool 1826 can be cutter 1871 controlled by fabrication controller 1812 can be a laser cutter and an inkjet printhead in a multifunction tool in automated manufacturing equipment 1814 in which the tool can move along an x axis on a bridge or gantry with the bridge or gantry being movable along a y-axis.

In another illustrative example, tool 1826 can marker 1873 controlled by fabrication controller 1812 to create the set of fiducial markers 1822. Tool 1826 can be, for example, an ink pen, inkjet printer, a sticker applicator, or some other device capable of creating a set of fiducial markers 1822. In one illustrative example, tool 1826 can be a hybrid tool containing both a cutter and a marker.

In another example, cutting tool 1826 can be end effector 1851. In one illustrative example, end effector 1851 can comprise an ultrasonic knife and an ink pen on a robotic arm in automated manufacturing equipment 1814.

In illustrative example, the set of fiducial markers 1822 can be created in a number of different ways. For example, creating the set of fiducial markers 1822 at the set of reference locations 1824 on composite ply 1816 is performed by fabrication controller 1812 controlling fabrication equipment 1808 to create the set of fiducial markers 1822 at the set of reference locations 1824 on composite ply 1816 after cutting composite ply 1816 to have shape 1818 defined by ply shape model 1820. In another illustrative example, fabrication controller 1812 can control fabrication equipment 1808 to create the set of fiducial markers 1822 at the set of reference locations 1824 on composite ply 1816 prior to cutting composite ply 1816 to have shape 1818 defined by ply shape model 1820.

In creating the set of fiducial markers 1822 at the set of reference locations 1824 on composite ply 1816, fabrication controller 1812 can control fabrication equipment 1808 to create the set of fiducial markers 1822 directly on composite ply 1816 at the set of reference locations 1824. In another illustrative example, fabrication controller 1812 can control fabrication equipment 1808 to create the set of fiducial markers 1822 directly on backing 1828 for composite ply 1816 at the set of reference locations 1824. In this case, the set of fiducial markers 1822 is performed indirectly on composite ply 1816.

In this illustrative example, the set of fiducial markers 1822 can take a number of different forms. For example, the set of fiducial markers 1822 can be comprised from least one of an ink, a reflective ink, a magnetic ink, a sticker, a paint, a liquid chalk, or some other suitable marketing mechanism.

In illustrative example, after cutting composite ply 1816 and creating a set of fiducial markers 1822 at the set of reference locations 1824, fabrication controller 1812 can control fabrication equipment 1808 to perform a set of manufacturing operations 1830 with composite ply 1816 having shape 1818 using the set of fiducial markers 1822 at the set of reference locations 1824 on composite ply 1816.

For example, fabrication controller 1812 can control fabrication equipment 1808 to perform a set of manufacturing operations 1830. In performing the set of manufacturing operations 1830, fabrication controller 1812 can control placement tool 1841 in fabrication equipment 1808 to perform pick operation 1831 that picks up composite ply 1816 from current position 1835 and places composite ply 1816 in desired position 1832 using the set of fiducial markers 1822. In this illustrative example, desired position 1832 can be location in three-dimensional space. For example, desired position 1832 can be described using the Cartesian coordinate system. Additionally, desired position 1832 can also identify in orientation for composite ply 1816.

In another illustrative example, fabrication controller 1812 can identify current position 1835 for a set of fiducial markers 1822 on composite ply 1816 using sensor system 1840. Fabrication controller 1812 can generate instructions 1833 for placement device 1841 to move an end effector on placement device 1841 from current position 1835 to a desired position 1832 with respect to the set of fiducial markers 1822. This desired position can be a position such that the end effector can pickup composite ply 1816 on which the set of fiducial markers 1822 are located.

In the illustrative example, fabrication controller 1812 can generate instructions 1833 can be generated to perform a number of manufacturing operations 1830. Instructions 1833 include at least one of code, commands, or data that can be used by automated manufacturing equipment 1814 to perform manufacturing operations 1830.

For example, fabrication controller 1812 can generate instructions 1833 for placement device 1841 to move the composite ply 1816 having shape 1818 from current position 1835 to a desired position 1832. In another illustrative example, fabrication controller 1812 can generate instructions 1833 for placement device 1841 to perform pick operation 1831 that picks up composite ply 1816 from current position 1835 and places composite ply 1816 in desired position 1832. In yet another illustrative example, fabrication controller 1812 can generate instructions 1833 for placement device 1841 to place composite ply 1816 in desired position 1832 on another composite ply 1837 as part of forming composite charge 1834.

In yet another illustrative example, fabrication controller 1812 can generate instructions 1833 for placement device 1841 to place composite ply 1816 on layup tool 1836. In this illustrative example, layup tool 1836 can be a component in fabrication equipment 1808 and can be, for example, a charge layup tool, a mandrel, a cure mandrel, or some other tool that can be used to process composite ply 1816 to form composite part 1804.

In this illustrative example, fabrication controller 1812 can control the operation of fabrication equipment 1808 including automated manufacturing equipment 1814 utilizing program 1838. Program 1838 can be, for example, a computer numerical control (CNC) program or some other suitable program code that may be used to control the operation of fabrication equipment 1808 including automated manufacturing equipment 1814.

As depicted, sensor system 1840 is a physical hardware system that detects information about fabrication equipment 1808 including automated manufacturing equipment 1814, the environment around fabrication equipment 1808 including automated manufacturing equipment 1814, or both, to generate sensor data 1842. Sensor system 1840 can be comprised of at least one of a camera system, a laser sensor, an ultrasonic sensor, a light detection and ranging scanner, an encoder, a rotary encoder, a temperature sensor, a pressure sensor, an accelerometer, or some other suitable type of sensor.

Sensor system 1840 can generate sensor data 1842 about the operation of fabrication equipment 1808 including automated manufacturing equipment 1814. Sensor data 1842 can be used by fabrication controller 1812 to control the operation of fabrication equipment 1808 including automated manufacturing equipment 1814. In this illustrative example, a portion or all of sensor system 1840 can be associated or connected to automated manufacturing equipment 1814, such a as placement device 1841.

For example, sensor system 1840 can comprise a camera located on in end effector 1851 of placement device 1841. With this example implementation, end effector 1851 be moved by fabrication controller 1812 sending instructions 1833 to placement device 1841 until the set of fiducial markers 1822 are in a selected position within the field of view of the camera in sensor system 1840.

For example, the set of fiducial markers 1822 can be centered within the image in sensor data 1842 generated by a camera on sensor system 1840. In this depicted, example, the set of fiducial markers 1822 position can be identified within ply shape model 1820. When the set of fiducial markers 1822 are in the correct location within the image, then the coordinates of the set of fiducial markers 1822 can be determined with respect a camera coordinate system for the camera in sensor system 1840. A transform can be used to transform the coordinates in the camera coordinate system into coordinates for a base coordinate system of the base of the robotic arm. Another transform is present for transforming the ordinance from the base coordinate system into coordinates for the end effector coordinate system.

In yet another illustrative example, the camera in sensor system 1840 may be located in another location other than on in end effector 1851. In this example, camera can be located such the camera can generate images of end effector 1851, the set of fiducial markers 1822, and desired position 1832 such as on layup tool 1836. In this example, an image can be of composite ply 1816 in a position in the camera coordinate system. A transform can made to transform the coordinates into the coordinate system for end effector 1851.

In this manner, a ply in the effector line in three dimensions can be determined. With this information, end effector 1851 can be moved to pick up ply 1816 from current position 1835. A similar process can be used to move composite ply 1816 from current position 1835 to a desired position 1832, such as on layup tool 1836 or on another composite ply 1837.

The illustration of composite part manufacturing environment 1800 in FIG. 18 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the set of manufacturing operations 1830 can take other forms in addition to the set of manufacturing operations 1830 described in the different illustrative examples. For example, the set of manufacturing operations 1830 can also include laying up composite ply 1816 with other composite plies to form a charge or composite preform. As another example, the set of manufacturing operations 1830 can include infusing a resin into composite ply 1816.

Figure 19:
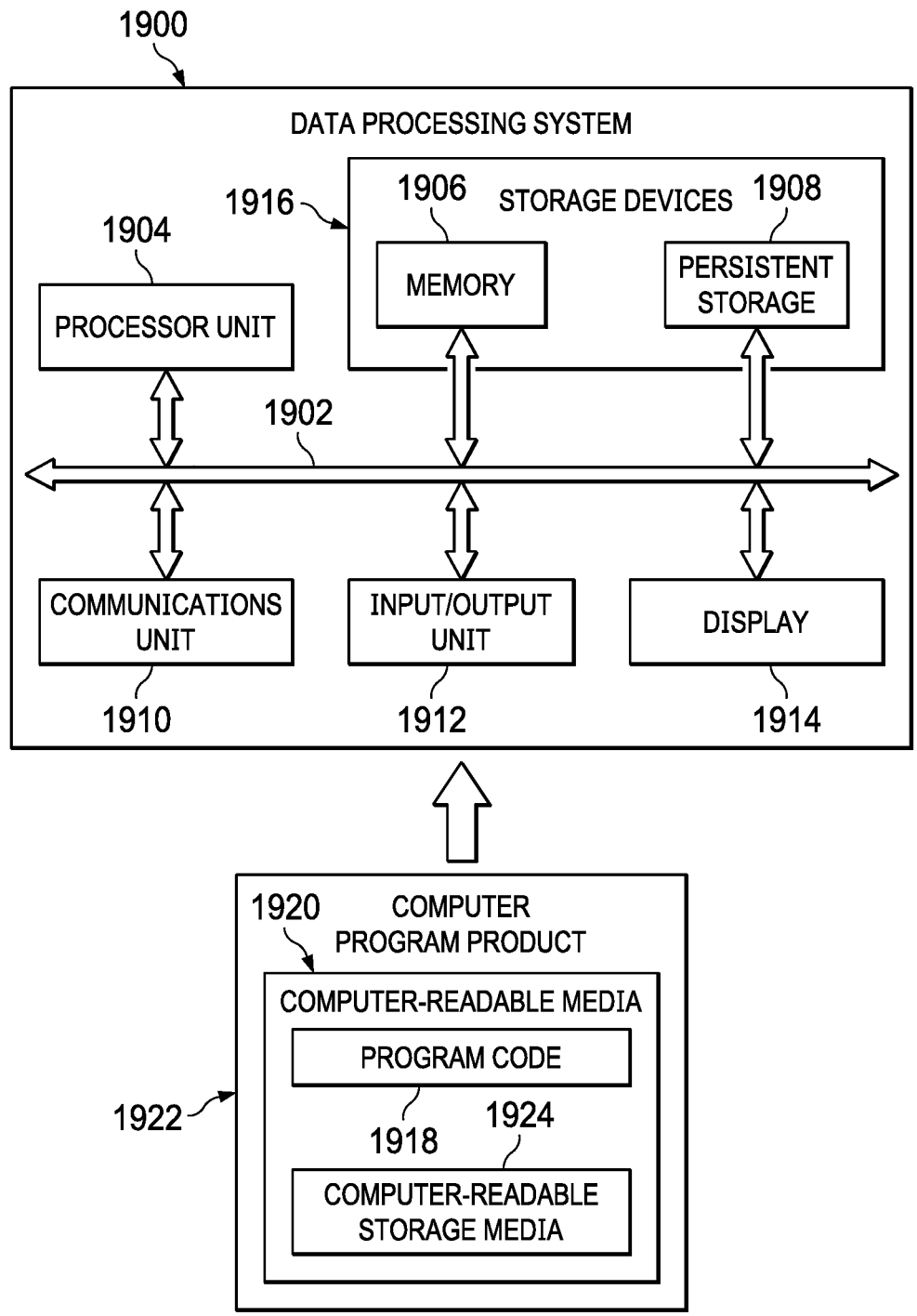
FIG. 19 is an illustration of a block diagram of a data processing system in accordance with an illustrative embodiment.

Turning now to FIG. 19, an illustration of a block diagram of a data processing system is depicted in accordance with an illustrative embodiment. Data processing system 1900 can be used to implement computer 174 in FIG. 1 and computer system 1810 in FIG. 18. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1904 can may be implemented using one or more heterogeneous processor systems in which a main processor is present with secondary processors on a single chip. As another illustrative example, processor unit 1904 can be a symmetric multi-processor system containing multiple processors of the same type on a single chip.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, can be, for example, a random-access memory or any other suitable volatile or non-volatile storage device. Persistent storage 1908 can take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 can provide a connection for user input through at least one of a keyboard, a mouse, or some other suitable input device. Further, input/output unit 1912 can send output to a printer. Display 1914 provides a mechanism to display information to a user.

Instructions for at least one of the operating systems, applications, or programs can be located in storage devices 1916, which are in communication with processor unit 1904 through communications framework 1902. The processes of the different embodiments can be performed by processor unit 1904 using computer-implemented instructions, which can be located in a memory, such as memory 1906.

These instructions are program instructions and are also referred to as program code, computer usable program code, or computer-readable program code that can be read and executed by a processor in processor unit 1904. The program code in the different embodiments can be embodied on different physical or computer-readable storage media, such as memory 1906 or persistent storage 1908.

Program code 1918 is located in a functional form on computer-readable media 1920 that is selectively removable and can be loaded onto or transferred to data processing system 1900 for execution by processor unit 1904. Program code 1918 and computer-readable media 1920 form computer program product 1922 in these illustrative examples. In the illustrative example, computer-readable media 1920 is computer-readable storage media 1924.

Computer-readable storage media 1924 is a physical or tangible storage device used to store program code 1918 rather than a media that propagates or transmits program code 1918. Computer readable storage media 1920, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1918 can be transferred to data processing system 1900 using a computer-readable signal media. The computer-readable signal media are signals and can be, for example, a propagated data signal containing program code 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1920" can be singular or plural. For example, program code 1918 can be located in computer-readable media 1920 in the form of a single storage device or system. In another example, program code 1918 can be located in computer-readable media 1920 that is distributed in multiple data processing systems. In other words, some instructions in program code 1918 can be located in one data processing system while other instructions in program code 1918 can be located in another data processing system. For example, a portion of program code 1918 can be located in computer-readable media 1920 in a server computer while another portion of program code 1918 can be located in computer-readable media 1920 located in a set of client computers.

The different components illustrated for data processing system 1900 are not meant to provide architectural limitations to the manner in which different embodiments can be implemented. In some illustrative examples, one or more of the components may be incorporated in or otherwise form a portion of, another component. For example, memory 1906, or portions thereof, can be incorporated in processor unit 1904 in some illustrative examples. The different illustrative embodiments can be implemented in a data processing system including components in addition to or in place of those illustrated for data processing system 1900. Other components shown in FIG. 19 can be varied from the illustrative examples shown. The different embodiments can be implemented using any hardware device or system capable of running program code 1918.

Figure 20:
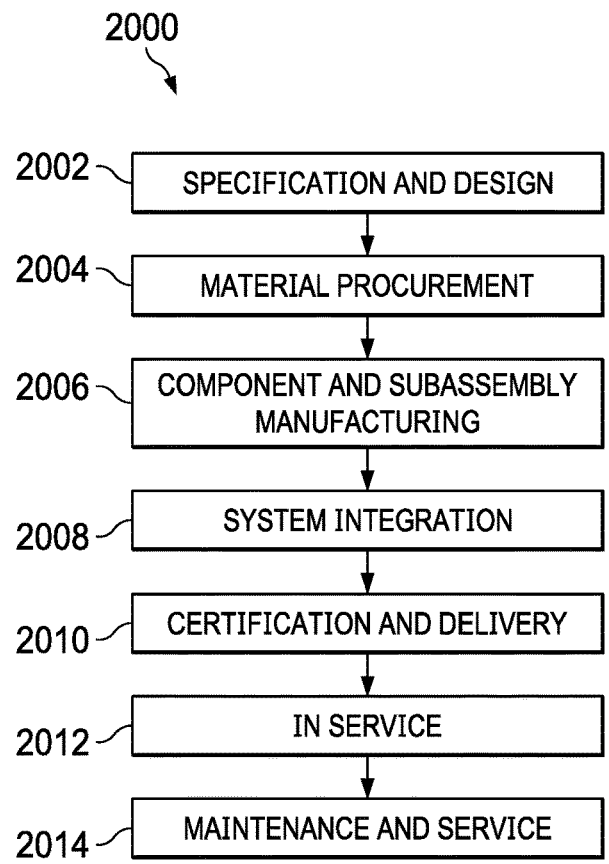
FIG. 20 is an illustration of an aircraft manufacturing and service method in accordance with an illustrative embodiment.
Figure 21:
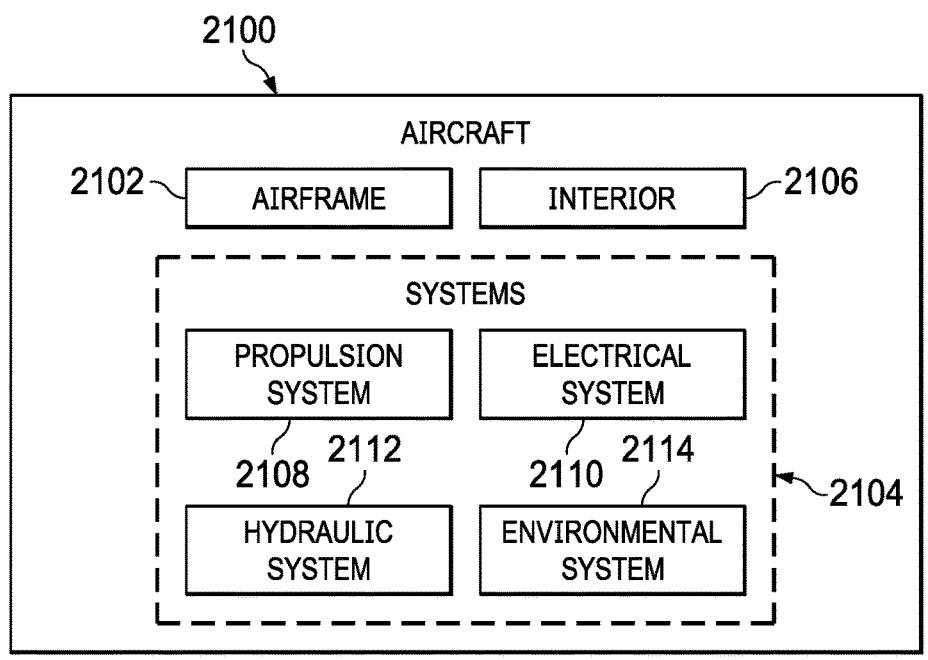
FIG. 21 is an illustration of a block diagram of an aircraft in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During preproduction, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of a block diagram of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. The use of a number of the different illustrative embodiments may substantially expedite the assembly of aircraft 2100, reduce the cost of aircraft 2100, or both expedite the assembly of aircraft 2100 and reduce the cost of aircraft 2100.

For example, composite manufacturing system 100 in FIG. 1 and composite manufacturing system 1802 in FIG. 18 can be used during component and subassembly manufacturing 2006 to manufacture composite parts. The use of additional markers can reduce the amount of rework or discarding of composite parts or charges or preforms for composite parts. As another example, composite manufacturing system 100 in FIG. 1 and composite manufacturing system 1802 in FIG. 18 can be used during maintenance and service 2014 to manufacture composite parts for various maintenance and service operations that may include modification, reconfiguration, refurbishment, and other maintenance or service.

Figure 22:
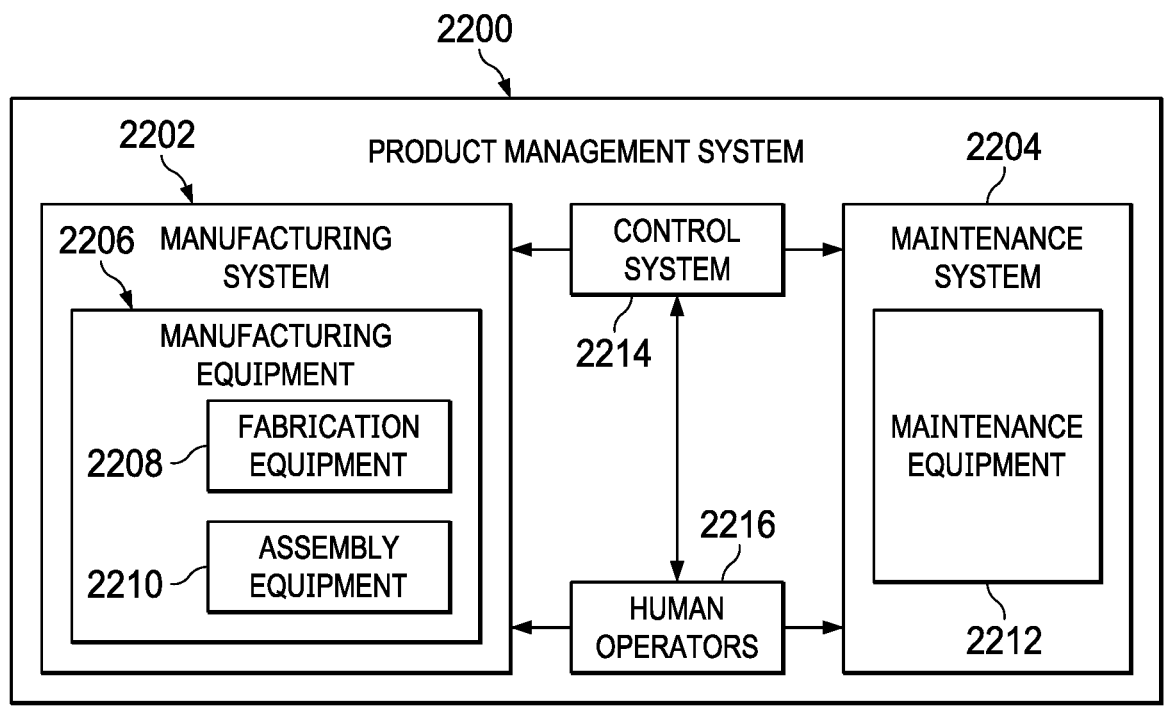
FIG. 22 is an illustration of a block diagram of a product management system in accordance with an illustrative embodiment.

Turning now to FIG. 22, an illustration of a block diagram of a product management system is depicted in accordance with an illustrative embodiment. Product management system 2200 is a physical hardware system. In this illustrative example, product management system 2200 includes at least one of manufacturing system 2202 or maintenance system 2204.

Manufacturing system 2202 is configured to manufacture products, such as aircraft 2100 in FIG. 21. As depicted, manufacturing system 2202 includes manufacturing equipment 2206. Manufacturing equipment 2206 includes at least one of fabrication equipment 2208 or assembly equipment 2210.

Fabrication equipment 2208 is equipment that is used to fabricate components for parts used to form aircraft 2100 in FIG. 21. For example, fabrication equipment 2208 can include machines and tools. These machines and tools can be at least one of a drill, a hydraulic press, a furnace, a mold, a composite tape laying machine, a vacuum system, a lathe, or other suitable types of equipment. Fabrication equipment 2208 can be used to fabricate at least one of metal parts, composite parts, semiconductors, circuits, fasteners, ribs, skin panels, spars, antennas, or other suitable types of parts.

Assembly equipment 2210 is equipment used to assemble parts to form aircraft 2100 in FIG. 21. In particular, assembly equipment 2210 is used to assemble components and parts to form aircraft 2100 in FIG. 21. Assembly equipment 2210 also can include machines and tools. These machines and tools may be at least one of a robotic arm, a crawler, a faster installation system, a rail-based drilling system, or a robot. Assembly equipment 2210 can be used to assemble parts such as seats, horizontal stabilizers, wings, engines, engine housings, landing gear systems, and other parts for aircraft 2100 in FIG. 21.

In this illustrative example, maintenance system 2204 includes maintenance equipment 2212. Maintenance equipment 2212 can include any equipment needed to perform maintenance on aircraft 2100 in FIG. 21. Maintenance equipment 2212 may include tools for performing different operations on parts on aircraft 2100 in FIG. 21. These operations can include at least one of disassembling parts, refurbishing parts, inspecting parts, reworking parts, manufacturing replacement parts, or other operations for performing maintenance on aircraft 2100 in FIG. 21. These operations can be for routine maintenance, inspections, upgrades, refurbishment, or other types of maintenance operations.

In the illustrative example, maintenance equipment 2212 may include ultrasonic inspection devices, x-ray imaging systems, vision systems, drills, crawlers, and other suitable devices. In some cases, maintenance equipment 2212 can include fabrication equipment 2208, assembly equipment 2210, or both to produce and assemble parts that needed for maintenance.

Product management system 2200 also includes control system 2214. Control system 2214 is a hardware system and may also include software or other types of components. Control system 2214 is configured to control the operation of at least one of manufacturing system 2202 or maintenance system 2204. In particular, control system 2214 can control the operation of at least one of fabrication equipment 2208, assembly equipment 2210, or maintenance equipment 2212.

The hardware in control system 2214 can be implemented using hardware that may include computers, circuits, networks, and other types of equipment. The control may take the form of direct control of manufacturing equipment 2206. For example, robots, computer-controlled machines, and other equipment can be controlled by control system 2214. In other illustrative examples, control system 2214 can manage operations performed by human operators 2216 in manufacturing or performing maintenance on aircraft 2100. For example, control system 2214 can assign tasks, provide instructions, display models, or perform other operations to manage operations performed by human operators 2216. In these illustrative examples, program 176 in FIG. 1 and fabrication controller 1812 in FIG. 18 can be implemented in control system 2214 to manage at least one of the manufacturing or maintenance of aircraft 2100 in FIG. 21. For example, at least one of program 176 in FIG. 1 or fabrication controller 1812 in FIG. 18 can operate to control the manufacture composite parts using fabrication equipment 2208 in manufacturing equipment 2206.

In the different illustrative examples, human operators 2216 can operate or interact with at least one of manufacturing equipment 2206, maintenance equipment 2212, or control system 2214. This interaction can occur to manufacture aircraft 2100 in FIG. 21.

Of course, product management system 2200 may be configured to manage other products other than aircraft 2100 in FIG. 21. Although product management system 2200 has been described with respect to manufacturing in the aerospace industry, product management system 2200 can be configured to manage products for other industries. For example, product management system 2200 can be configured to manufacture products for the automotive industry as well as any other suitable industries.

Some features of the illustrative examples are described in the following clauses. These clauses are examples of features not intended to limit other illustrative examples.

Clause 1
A method for manufacturing a composite part, the method comprising:
identifying a set of reference locations for a set of fiducial markers on a composite ply from a ply shape model for the composite part;
creating the set of fiducial markers at the set of reference locations on the composite ply; and
cutting the composite ply to have a shape defined by the ply shape model.

Clause 2:
The method according to clause 1 further comprising:
identifying a current position of the composite ply having the shape using the set of fiducial markers using a sensor system; and
generating instructions for a placement device to move the composite ply having the shape from the current position to a desired position.

Clause 3:
The method according to clause 2, wherein generating instructions for the placement device to move the composite ply having the shape from the current position to the desired position comprises:
generating the instructions for the placement device to perform a pick operation that picks up the composite ply from the current position and places the composite ply in the desired position.

Clause 4:
The method according to one of clause 2 or 3, wherein generating instructions for the placement device to move the composite ply having the shape from the current position to the desired position comprises:
generating the instructions for the placement device to place the composite ply in the desired position on another composite ply as part of forming a composite charge.

Clause 5:
The method according to one of clauses 2, 3, or 4, wherein generating instructions for the placement device to move the composite ply having the shape from the current position to the desired position comprises:
generating the instructions for the placement device to place the composite ply on a layup tool.

Clause 6:
The method according to one of clauses 1, 2, 3, 4, or 5 further comprising:
identifying a current position for the set of fiducial markers on composite ply using a sensor system;
generating instructions for a placement device to move an end effector on the placement device from current position to a desired position with respect the set of fiducial markers Clause 7:
The method according to one of clauses 1, 2, 3, 4, or 5, wherein cutting the composite ply to have the shape defined by the ply shape model comprises:
cutting the composite ply to have the shape defined by the ply shape model with a tool; and
wherein forming the set of fiducial markers at the set of reference locations on the composite ply comprises:
creating the set of fiducial markers at the set of reference locations on the composite ply with the cutting tool.

Clause 8:
The method according to one of clauses 1, 2, 3, 4, 5, 6, or 7, wherein creating the set of fiducial markers at the set of reference locations on the composite ply comprises:
creating the set of fiducial markers at the set of reference locations on the composite ply after cutting the composite ply to have the shape defined by the ply shape model.

Clause 9:
The method according to one of clauses 1, 2, 3, 4, 5, 6, 7, or 8, wherein creating the set of fiducial markers at the set of reference locations on the composite ply comprises:

creating the set of fiducial markers at the set of reference locations on the composite ply prior to cutting the composite ply to have the shape defined by the ply shape model.

Clause 10:
The method according to one of clauses 1, 2, 3, 4, 5, 6, 7, 8, or 9, wherein creating the set of fiducial markers at the set of reference locations on the composite ply comprises:
creating the set of fiducial markers directly on the composite ply at the set of reference locations.

Clause 11:
The method according to one of clauses 1, 2, 3, 4, 5, 6, 7, 8, 9, or 10, wherein creating the set of fiducial markers at the set of reference locations on the composite ply comprises:
creating the set of fiducial markers directly on a backing for the composite ply at the set of reference locations.

Clause 12:
The method according to one of clauses 1, 2, 3, 4, 5, 6, 7, 8, 9, 10, or 11, wherein the set of fiducial markers is comprised of at least one of an ink, a reflective ink, a magnetic ink, a sticker, a paint, or a liquid chalk.

Clause 13:
The method according to one of clauses 1, 2, 3, 4, 5, 6, 7, 8, 9, 10, 11, or 12, wherein the composite ply is processed to form the composite part for a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Clause 14:
A method for manufacturing a composite part, the method comprising:
cutting a composite ply to have a shape defined by a ply shape model for the composite part using automated manufacturing equipment; and
creating a set of fiducial markers at a set of reference locations on the composite ply using the automated manufacturing equipment.

Clause 15:
The method according to claim 14 further comprising:
identifying the set of reference locations for the set of fiducial markers on the composite ply from the ply shape model.

Clause 16:
The method according to one of clauses 14 or 15 further comprising:
identifying a current position of the composite ply having the shape using the set of fiducial markers using a sensor system; and
generating instructions for a placement device to move the composite ply having the shape from the current position to a desired position.

Clause 17:
The method according to one of clauses 14, 15, or 16, wherein creating the set of fiducial markers at the set of reference locations on the composite ply using the automated manufacturing equipment comprises:
creating the set of fiducial markers at the set of reference locations on the composite ply using the automated manufacturing equipment after cutting the composite ply to have the shape defined by the ply shape model using the automated manufacturing equipment.

Clause 18:
The method according to one of clauses 14, 15, 16, or 17, wherein creating the set of fiducial markers at the set of reference locations on the composite ply using the automated manufacturing equipment comprises:
creating the set of fiducial markers at the set of reference locations on the composite ply using the automated manufacturing equipment prior to cutting the composite ply to have the shape defined by the ply shape model using the automated manufacturing equipment.

Clause 19:
The method according to one of clauses 14, 15, 16, 17, or 18, wherein creating the set of fiducial markers at the set of reference locations on the composite ply using the automated manufacturing equipment comprises:
creating the set of fiducial markers directly on the composite ply at the set of reference locations using the automated manufacturing equipment.

Clause 20:
The method according to one of clauses 14, 15, 16, 17, 18, or 19, wherein creating the set of fiducial markers at the set of reference locations on the composite ply using the automated manufacturing equipment comprises:
creating the set of fiducial markers directly on a backing for the composite ply at the set of reference locations using the automated manufacturing equipment.

Clause 21:
A composite manufacturing system comprising:
fabrication equipment; and
a fabrication controller in a computer system that controls fabrication equipment to:
identify a set of reference locations for a set of fiducial markers on a composite ply from a ply shape model for a composite part;
form the set of fiducial markers at the set of reference locations on the composite ply; and
cut the composite ply to have a shape defined by the ply shape model.

Clause 22:
The composite manufacturing system according to clause 21, wherein the fabrication controller controls the fabrication equipment to:
identify a current position of the composite ply having the shape using the set of fiducial markers using a sensor system; and
generate instructions for a placement device to move the composite ply having the shape from the current position to a desired position.

Clause 23:
The composite manufacturing system according to clause 22, wherein in generating instructions for the placement device to move the composite ply having the shape from the current position to the desired position, the fabrication controller controls the fabrication equipment to:
generate the instructions for the placement device to perform a pick operation that picks up the composite ply from the current position and places the composite ply in the desired position.

Clause 24:
The composite manufacturing system according to clause 22, wherein in generating instructions for the placement device to move the composite ply having the shape from the current position to the desired position, the fabrication controller controls the fabrication equipment to:

generate the instructions for the placement device to place the composite ply in the desired position on another composite ply as part forming a composite charge.

Clause 25:
The composite manufacturing system according to clause 22, wherein in generating instructions for the placement device to move the composite ply having the shape from the current position to the desired position, the fabrication controller controls the fabrication equipment to:
generate the instructions for the placement device to place the composite ply on a layup tool.

Clause 26:
The composite manufacturing system according to one of clauses 21, 22, 23, 24, or 25, wherein in cutting the composite ply to have the shape defined by the ply shape model, the fabrication controller controls the fabrication equipment to:
cut the composite ply to have the shape defined by the ply shape model with a tool; and
wherein in creating the set of fiducial markers at the set of reference locations on the composite ply, the fabrication controller controls the fabrication equipment to:
form the set of fiducial markers at the set of reference locations on the composite ply with the cutting tool.

Clause 27:
The composite manufacturing system according to according to one of clauses 21, 22, 23, 24, 25, or 26, wherein in creating the set of fiducial markers at the set of reference locations on the composite ply, the fabrication controller controls the fabrication equipment to:
create the set of fiducial markers at the set of reference locations on the composite ply after cutting the composite ply to have the shape defined by the ply shape model.

Clause 28:
The composite manufacturing system according to according to one of clauses 21, 22, 23, 24, 25, 26, or 27, wherein in creating the set of fiducial markers at the set of reference locations on the composite ply, the fabrication controller controls the fabrication equipment to:
create the set of fiducial markers at the set of reference locations on the composite ply prior to cutting the composite ply to have the shape defined by the ply shape model.

Clause 29:
The composite manufacturing system according to according to one of clauses 21, 22, 23, 24, 25, 26, 27, or 28, wherein in creating the set of fiducial markers at the set of reference locations on the composite ply, the fabrication controller controls the fabrication equipment to:
create the set of fiducial markers directly on the composite ply at the set of reference locations.

Clause 30:
The composite manufacturing system according to according to one of clauses 21, 22, 23, 24, 25, 26, 27, 28, or 29, wherein in creating the set of fiducial markers at the set of reference locations on the composite ply, the fabrication controller controls the fabrication equipment to:
create the set of fiducial markers directly on a backing for the composite ply at the set of reference locations.

Clause 31:
The composite manufacturing system according to one of clauses 21, 22, 23, 24, 25, 26, 27, 28, 29, or 30, wherein the set of fiducial markers is comprised of at least one of an ink, a reflective ink, a magnetic ink, a sticker, a paint, or a liquid chalk.

Clause 32:
The composite manufacturing system according to one of clauses 21, 22, 23, 24, 25, 26, 27, 28, 29, 30, or 31, wherein the composite ply is processed to form the composite part for a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Clause 33:
A composite manufacturing system comprising:
fabrication equipment; and
a fabrication controller in a computer system that controls fabrication equipment to:
cut a composite ply to have a shape defined by a ply shape model for a composite part; and
create a set of fiducial markers at a set of reference locations on the composite ply.

Clause 34:
The composite manufacturing system according to clause 33, wherein the fabrication controller controls the fabrication equipment to:
identify the set of reference locations for the set of fiducial markers on the composite ply from the ply shape model.

Clause 35:
The composite manufacturing system according to one of clauses 33, 34, or 35, wherein the fabrication controller controls the fabrication equipment to:
identify a current position of the composite ply having the shape using the set of fiducial markers using a sensor system; and
generate instructions for a placement device to move the composite ply having the shape from the current position to a desired position.

Clause 35:
The composite manufacturing system according to one of clauses 33 or 34, wherein in creating the set of fiducial markers at the set of reference locations on the composite ply, the fabrication controller controls the fabrication equipment to:
create the set of fiducial markers at the set of reference locations on the composite ply after cutting the composite ply to have the shape defined by the ply shape model.

Clause 37:
The composite manufacturing system according to one of clauses 33, 34, 35, or 36, wherein in creating the set of fiducial markers at the set of reference locations on the composite ply, the fabrication controller controls the fabrication equipment to:
create the set of fiducial markers at the set of reference locations on the composite ply prior to cutting the composite ply to have the shape defined by the ply shape model.

Clause 38:
The composite manufacturing system according to one of clauses 33, 34, 35, 36, or 37, wherein in creating the set of fiducial markers at the set of reference locations on the composite ply, the fabrication controller controls the fabrication equipment to:
create the set of fiducial markers directly on the composite ply at the set of reference locations.

Clause 39:

The composite manufacturing system according to one of clauses 33, 34, 35, 36, 37, or 38, wherein in creating the set of fiducial markers at the set of reference locations on the composite ply, the fabrication controller controls the fabrication equipment to:

create the set of fiducial markers directly on a backing for the composite ply at the set of reference locations.

Thus, in one or more illustrative examples, the final position of a composite ply can be a combination of the accuracy of the creating of fiducial markers onto the composite ply, final robot accuracy and the tolerances of the boundaries. Fiducial markers in the different illustrative examples are easier to implement and more accurate than other approaches such as those using boundaries for determining movement of each component. In the illustrative examples, the composite ply can be cut to a desired shape, and the fiducial maker on that composite ply with the desired shape can be created in the same location, such as in the same cell and on the same cutting machine. Further, determining locations using fiducial markers is simpler as compared to extracting boundaries because boundaries of the composite plies can be fluffy or have loose threads.

Additionally, with the use of additional markers, the field of view of the camera is much smaller when only the section of the composite ply with the fiducial makers needs to be inspected as compared to the entire composite ply boundaries being used. As a result, the use of fiducial markers can result in a better pixels/mm resolution as compared to current techniques using boundaries. In other words, a greater density of pixels can be present in an image with fiducial markers as compared to an image using ply boundaries.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a composite part, the method comprising:

identifying a reference location for a fiducial marker on a composite ply from a ply shape model for the composite part;

mounting an end effector, housing a marker adjacent to a cutter, onto a gantry configured to move the end effector along a single axis;

mounting the gantry onto a flatbed configured to move the gantry along an second axis distinct from the single axis;

marking, with the marker in the end effector prior to indexing the composite ply to a pick area, the fiducial marker at the reference location on the composite ply;

cutting, with the cutter in the end effector, the composite ply to have a shape defined by the ply shape model;

forming a measurement from the fiducial marker with respect to a robot adjacent to the flatbed;

subsequently, the robot adjacent to the flatbed placing, using the measurement from the fiducial marker, the ply into storage;

forming a second measurement from the fiducial marker with respect to a second robot; and subsequently, the second robot picking up, using the second measurement from the fiducial marker, the composite ply from storage and forming a charge by placing the composite ply onto a preform table.

2. The method of claim 1 further comprising:

identifying a current position of the composite ply having the shape using the fiducial marker using a sensor system; and generating instructions for a placement device to move the composite ply having the shape from the current position to a desired position.

3. The method of claim 2, wherein generating instructions for the placement device to move the composite ply having the shape from the current position to the desired position comprises:

generating the instructions for the placement device to perform a pick operation that picks up the composite ply from the current position and places the composite ply in the desired position.

4. The method of claim 2, wherein generating instructions for the placement device to move the composite ply having the shape from the current position to the desired position comprises:

generating the instructions for the placement device to place the composite ply in the desired position on another composite ply as part of forming a composite charge.

5. The method of claim 2, wherein generating instructions for the placement device to move the composite ply having the shape from the current position to the desired position comprises:

generating the instructions for the placement device to place the composite ply on a layup tool.

6. The method of claim 1 further comprising:

identifying a current position for the fiducial marker on the composite ply using a sensor system; and generating instructions for a placement device to move the placement device from a current position of the placement device to a desired position of the placement device with respect to the fiducial marker.

7. The method of claim 1, wherein creating the fiducial marker at the reference location on the composite ply comprises:

creating the fiducial marker at the reference location on the composite ply after cutting the composite ply to have the shape defined by the ply shape model.

8. The method of claim 1, wherein creating the fiducial marker at the reference location on the composite ply comprises:

creating the fiducial marker at the reference location on the composite ply prior to cutting the composite ply to have the shape defined by the ply shape model.

9. The method of claim 1, wherein creating the fiducial marker at the reference location on the composite ply comprises:
creating the fiducial marker directly on the composite ply at the reference location.

10. The method of claim 1, wherein creating the fiducial marker at the reference location on the composite ply comprises:
creating the fiducial marker directly on a backing for the composite ply at the reference location.

11. The method of claim 1, wherein the fiducial marker is comprised of at least one of an ink, a reflective ink, a magnetic ink, a sticker, a paint, or a liquid chalk.

12. A method for manufacturing a composite part, the method comprising:
mounting an end effector, housing a marker adjacent to a cutter, onto a gantry configured to move the end effector along a single axis;
mounting the gantry onto a flatbed configured to move the gantry along an second axis distinct from the single axis;
cutting a composite ply to a shape defined by a ply shape model for the composite part by using the cutter;
creating, prior to indexing the composite ply to a pick area, a fiducial marker at a reference location on the composite ply by using the marker in the end effector;
forming a measurement from the fiducial marker with respect to a pick and place robot adjacent to the flatbed;
the pick and place robot, using the measurement from the fiducial marker, placing the composite ply in a kit in an automated cutting and kitting cell;
subsequently moving the kit adjacent to a second pick and place robot adjacent to a preform table in a layup cell;
forming a second measurement from the fiducial marker with respect to the second pick and place robot; and
subsequently the second pick and place robot, using the second measurement from the fiducial marker, removing the composite ply from the kit and placing the composite ply on the preform table.

13. The method of claim 12, further comprising the preform table comprising metallic strips bonded and forming a grid.

14. A composite manufacturing system that comprises:
fabrication equipment that comprises:
a pick and place robot adjacent to a flatbed;
a gantry mounted on the flatbed and configured to move along a single axis of the flatbed; and
an end effector that houses a marker adjacent to a cutter, the end effector mounted on and configured to move on the gantry along a second axis that differs from the single axis; and
a fabrication controller in a computer system configured to control the fabrication equipment to:
identify a set of reference locations for a set of fiducial markers on a composite ply from a ply shape model for a composite part;
move the marker and mark, prior to formation of an index of the composite ply to a pick area, the set of fiducial markers at the set of reference locations on the composite ply;
move the cutter in the end effector and cut the composite ply to have a shape defined by the ply shape model;
form a first measurement from the set of fiducial markers with respect to the pick and place robot adjacent to the flatbed;
pick, with the pick and place robot based upon the first measurement from the set of fiducial markers, the composite ply off the flatbed and place the composite ply into a kit;
form a second measurement from the set of fiducial markers with respect to a second pick and place robot; and
subsequently pick up, with the second pick and place robot based upon the second measurement from the set of fiducial markers, the composite ply from the kit and place the composite ply onto a preform table.

15. The composite manufacturing system of claim 14, wherein the fabrication controller is further configured to control the fabrication equipment to:
identify a current position of the composite ply having the shape using the set of fiducial markers using a sensor system; and
generate instructions for a placement device to move the composite ply having the shape from the current position to a desired position.

16. The composite manufacturing system of claim 15, wherein the fabrication controller is further configured to control the fabrication equipment to generate the instructions for the placement device to perform a pick operation that picks up the composite ply from the current position and places the composite ply in the desired position.

17. The composite manufacturing system of claim 15, wherein the fabrication controller is further configured to control the fabrication equipment to generate the instructions for the placement device to place the composite ply in the desired position on another composite ply as part of forming a composite charge.

18. The composite manufacturing system of claim 15, wherein the fabrication controller is further configured to control the fabrication equipment to generate the instructions for the placement device to place the composite ply on a layup tool.

19. The composite manufacturing system of claim 14, wherein the cutter comprises at least one of: an electric oscillating knife, a drag knife, and ultrasonic knife, and a laser cutter.

20. The composite manufacturing system of claim 14, wherein the fabrication controller is further configured to control the fabrication equipment to create the set of fiducial markers at the set of reference locations on the composite ply after cutting the composite ply to have the shape defined by the ply shape model.

21. The composite manufacturing system of claim 14, wherein the fabrication controller is further configured to control the fabrication equipment to create the set of fiducial markers at the set of reference locations on the composite ply prior to cutting the composite ply to have the shape defined by the ply shape model.

22. The composite manufacturing system of claim 14, wherein the fabrication controller is further configured to control the fabrication equipment to create the set of fiducial markers directly on the composite ply at the set of reference locations.

23. The composite manufacturing system of claim 14, wherein the fabrication controller is further configured to control the fabrication equipment to create the set of fiducial markers directly on a backing for the composite ply at the set of reference locations.

24. The composite manufacturing system of claim 14, wherein the fabrication controller is further configured to control the fabrication equipment to:
- pick up the composite ply from an automated cutting and marking machine and place the composite ply in a kit in an automated cutting and kitting cell;
- pick up the composite ply from the kit and place the composite ply onto a preform table in an automated charge layup cell; and
- form the composite ply into a charge.

* * * * *